(12) United States Patent
Kumagai et al.

(10) Patent No.: US 10,389,626 B2
(45) Date of Patent: Aug. 20, 2019

(54) TRANSFER DEVICE

(71) Applicant: ALAXALA Networks Corporation, Kawasaki-shi, Kanagawa (JP)

(72) Inventors: Takeshi Kumagai, Kawasaki (JP); Kazuo Sugai, Kawasaki (JP); Shinichi Akahane, Kawasaki (JP); Takayuki Muranaka, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 0 days.

(21) Appl. No.: 15/912,606

(22) Filed: Mar. 6, 2018

(65) Prior Publication Data

US 2018/0287939 A1 Oct. 4, 2018

(30) Foreign Application Priority Data

Mar. 28, 2017 (JP) .................................. 2017-062610
Nov. 10, 2017 (JP) .................................. 2017-217419

(51) Int. Cl.
*H04L 29/06* (2006.01)
*H04L 12/741* (2013.01)
(Continued)

(52) U.S. Cl.
CPC .............. *H04L 45/54* (2013.01); *H04L 45/74* (2013.01); *H04L 45/741* (2013.01); *H04L 45/745* (2013.01); *H04L 45/748* (2013.01); *H04L 49/3009* (2013.01); *H04L 69/22* (2013.01); *G06F 11/00* (2013.01); *H04L 45/60* (2013.01); *H04L 45/7453* (2013.01); *H04L 45/7457* (2013.01); *H04L 47/34* (2013.01)

(58) Field of Classification Search
CPC ....... H04L 45/54; H04L 45/74; H04L 45/742; H04L 45/745; H04L 45/7453; H04L 45/7457; H04L 45/748; H04L 49/3009; H04L 69/22
See application file for complete search history.

(56) References Cited

U.S. PATENT DOCUMENTS

| 6,760,323 | B1 * | 7/2004 | Strandberg | ........... | H04L 12/4604 |
| | | | | | 370/352 |
| 2012/0163392 | A1 * | 6/2012 | Park | ........... | H04L 45/60 |
| | | | | | 370/401 |
| 2013/0114599 | A1 * | 5/2013 | Arad | ............. | H04L 49/358 |
| | | | | | 370/392 |

FOREIGN PATENT DOCUMENTS

WO 2014125636 A1 8/2014

* cited by examiner

*Primary Examiner* — Kevin C. Harper
(74) *Attorney, Agent, or Firm* — Mattingly & Malur, PC

(57) ABSTRACT

A transfer device transfers communication data, comprising: a search unit having a first search means that includes a first table and a first search circuit, the search unit referring to the first table using the first search circuit to search for the first transfer destination information from the first destination information; a search control unit that is a reconfigurable mechanism that creates search designation information and executes a first search designation information creation process of creating first search designation information; a control unit that controls the search unit and creates in the search unit at least a second search means including a second table and a second search circuit, the control unit controlling the search control unit to add to the search control unit a second search designation information creation process; and a transfer unit that receives the communication data and transmits the communication data to a transfer destination.

11 Claims, 19 Drawing Sheets

(51) Int. Cl.
*H04L 12/743* (2013.01)
*H04L 12/749* (2013.01)
*H04L 12/745* (2013.01)
*H04L 12/773* (2013.01)
*H04L 12/801* (2013.01)
*H04L 12/935* (2013.01)
*G06F 11/00* (2006.01)

TRANSFER DEVICE

CLAIM OF PRIORITY

The present application claims priority from Japanese patent applications JP 2017-062610 filed on Mar. 28, 2017 and JP 2017-217419 filed on Nov. 10, 2017, the contents of which are hereby incorporated by reference into this application.

BACKGROUND

The present invention relates to a transfer device that searches for a header of communication data such as frames and packets and determines the transfer destination.

Conventionally, improvement in transfer performance is always being sought for transfer devices such as routers and switches. Thus, transfer devices need to determine the transfer destination of communication headers using hardware where the processing content cannot be modified such as an LSI, which has a high processing performance, instead of software processing or reconfigurable hardware such as FPGAs.

In search processes by hardware such as LSI, the format of the header to be handled is determined in advance, and the hardware uses a predetermined field as a search key and performs a search according to a predetermined search mode.

When determining the next transfer destination from the destination IP address, for example, the transfer device performs a search by a predetermined search mode referred to as longest prefix search to determine the next transfer destination. In a search process by hardware such as an LSI, there was a problem that there was no backwards compatibility for searching frames of new header formats that appeared after the LSI was commercialized.

In order to solve this problem, the communication device of WO/2014/125636 has a packet processing-only hardware that performs packet search and a transfer process, and a packet analysis processor that can programmably analyze the packet format and perform a packet transfer process. When determining whether the packet format can be processed by the packet processing-only hardware, if it is determined that the packet format cannot be processed by the packet processing-only hardware, the packet analysis process converts the packet to a processable packet format and transfers the packet to the packet processing-only hardware.

If the packet header process cannot be performed by the packet processing-only hardware, then the communication device of WO/2014/125636 converts the packet to a processable packet format. However, it is not possible to flexibly perform a search according to search specifications required for newly emerged frame header formats in a latter stage packet processing-only hardware, through packet conversion alone.

One example is a case in which the transfer destination is determined with a long field of approximately 32 bits as the search key. In such a case, the length of the field to be the search key does not change by simply converting the packet header. Thus, the packet processing-only hardware needs to search the destination with the 32 bit search key. When searching for the 32 bit field, if simply pulling a table with the 32-bit value as an index, a table with 4 giga-entries ($2^{32}$) needs to be looked up, which requires a large amount of memory. Similarly, if the search field width is 48 bits, for example, then a table with 256 tera-entries ($2^{48}$) needs to be looked up, which requires a nearly impossible amount of memory.

SUMMARY

An object of the present invention is to flexibly handle required search specifications when searching for a transfer destination with header formats that have newly emerged after commercialization while realizing high speed through hardware processing.

An aspect of the invention disclosed in this application is a transfer device that transfers communication data, comprising: a search unit having a search resource group that is a collection of search resources constituted of tables that associate key items with other items, and search circuits that refer to the tables and search for values of the other items from values of the key items that are fields in the header of the communication data, the search resource group having at least a first search means that includes a first search resource that is constituted of a first table that associates first destination information of the communication data that is the value of the key item with first transfer destination information that is the value of the other item according to a first header format of the communication data, and a first search circuit that searches the first transfer destination information from the first destination information with reference to the first table, the search unit referring to the first table using the first search circuit to search for the first transfer destination information from the first destination information when the first search means and the first destination information are designated; a search control unit that is a reconfigurable mechanism that creates search designation information that designates a position and size of the field in which the destination information is stored according to a format of the header, and a search means constituted of one or more search resources, and that outputs the search designation information to the search unit, the search control unit executing a first search designation information creation process of creating first search designation information that designates the first destination information and the first search means identified according to the first header format and outputting the first search designation information to the search unit, if the format of the header is the first header format; a control unit that controls the search unit and, in remaining search resources of the search resource group excluding the first search resource, sets a second table that associates second destination information that is the value of the key item with the second transfer destination information that is the value of the other item according to a second header format of the communication data, thereby creating in the search unit at least a second search means including a second search resource constituted of the second table and a second search circuit that refers to the second table to search for the second transfer destination information from the second destination information, the control unit controlling the search control unit to add to the search control unit a second search designation information creation process of creating second search designation information that designates the second search means and the second destination information if the format of the header is the second header format, and outputting the second search designation information to the search unit; and a transfer unit that receives the communication data and transmits the communication data to a transfer destination on the basis of the transfer destination information searched according to the format of the header by the search unit.

According to a representative embodiment of the present invention, it is possible to flexibly handle search specifications required for new header formats while realizing high speed through hardware processing. Other objects, configurations, and effects than those described above are clarified by the following description of an embodiment.

DETAILED DESCRIPTION OF THE EMBODIMENT

Embodiment 1

Network Configuration Example

Figure 1:
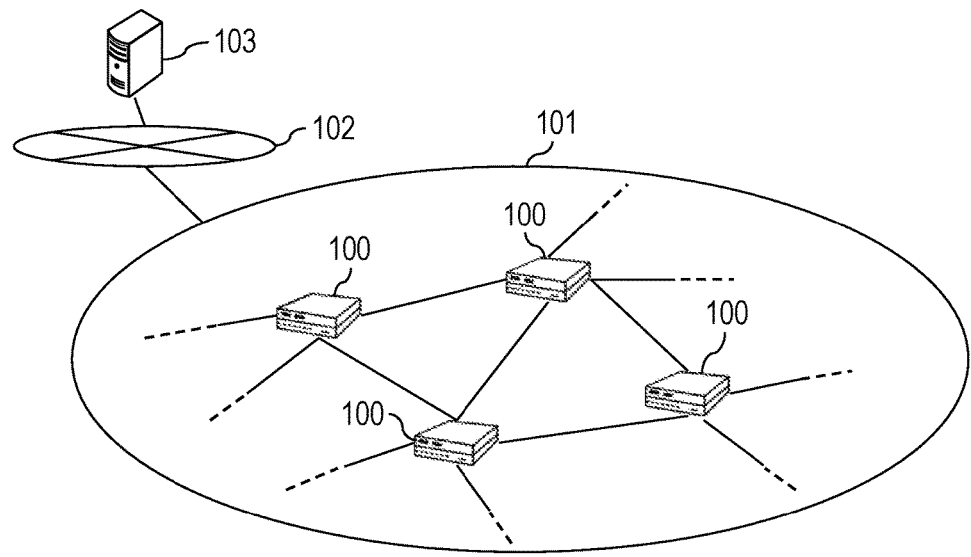
FIG. 1 is a descriptive drawing showing a network configuration example according to Embodiment 1.

FIG. 1 is a descriptive drawing showing a network configuration example according to Embodiment 1. Each of the plurality of transfer devices 100 is connected to one or more other transfer devices 100 to form a first network 101 such as Layer 2, Layer 3, and MPLS (Multiprotocol Label Switching). Also, each transfer device 100 is connected to a management server 103 through a second network 102 for management.

Hardware Configuration Example of Transfer Device 100

Figure 2:
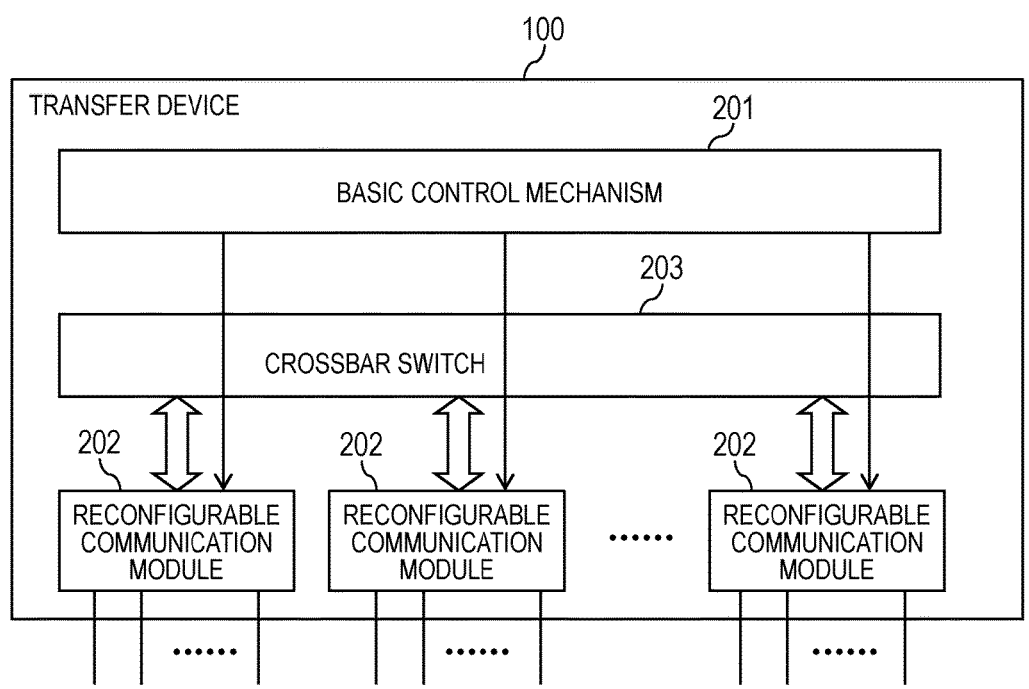
FIG. 2 is a block diagram showing a hardware configuration example of the transfer device according to Embodiment 1.

FIG. 2 is a block diagram showing a hardware configuration example of the transfer device 100 according to Embodiment 1. The transfer device 100 has a basic control mechanism 201, reconfigurable communication modules 202, and a crossbar switch 203. If there is only one reconfigurable communication module 202, then a crossbar switch 203 is unnecessary.

The basic control mechanism 201 is a control unit that sets the reconfigurable communication modules 202 as well as performing learning of various tables, and reconfigures the reconfigurable communication modules 202. If, for example, a new header format emerges, then the basic control mechanism 201 reconfigures the reconfigurable communication module 202 so as to be able to perform a transfer with the new header format. The reconfigurable communication module 202 searches for the destination of the communication data, determines the transfer device 100 to which to send the communication data, and sends the communication data thereto.

If a new header format emerges, then the reconfigurable communication module 202 is reconfigured by control from the basic control mechanism 201 so as to be able to perform a transfer with the new header format.

The crossbar switch 203 is a communication path for transferring communication data from a given reconfigurable communication module 202 to another reconfigurable communication module 202 if a plurality of reconfigurable communication modules 202 are installed. If there are a plurality of reconfigurable communication modules 202, then possible scenarios include one in which communication data is returned back to the same reconfigurable communication module 202, or one in which communication data is transferred among the plurality of reconfigurable communication modules 202.

Configuration Example of Reconfigurable Communication Module 202

Figure 3:
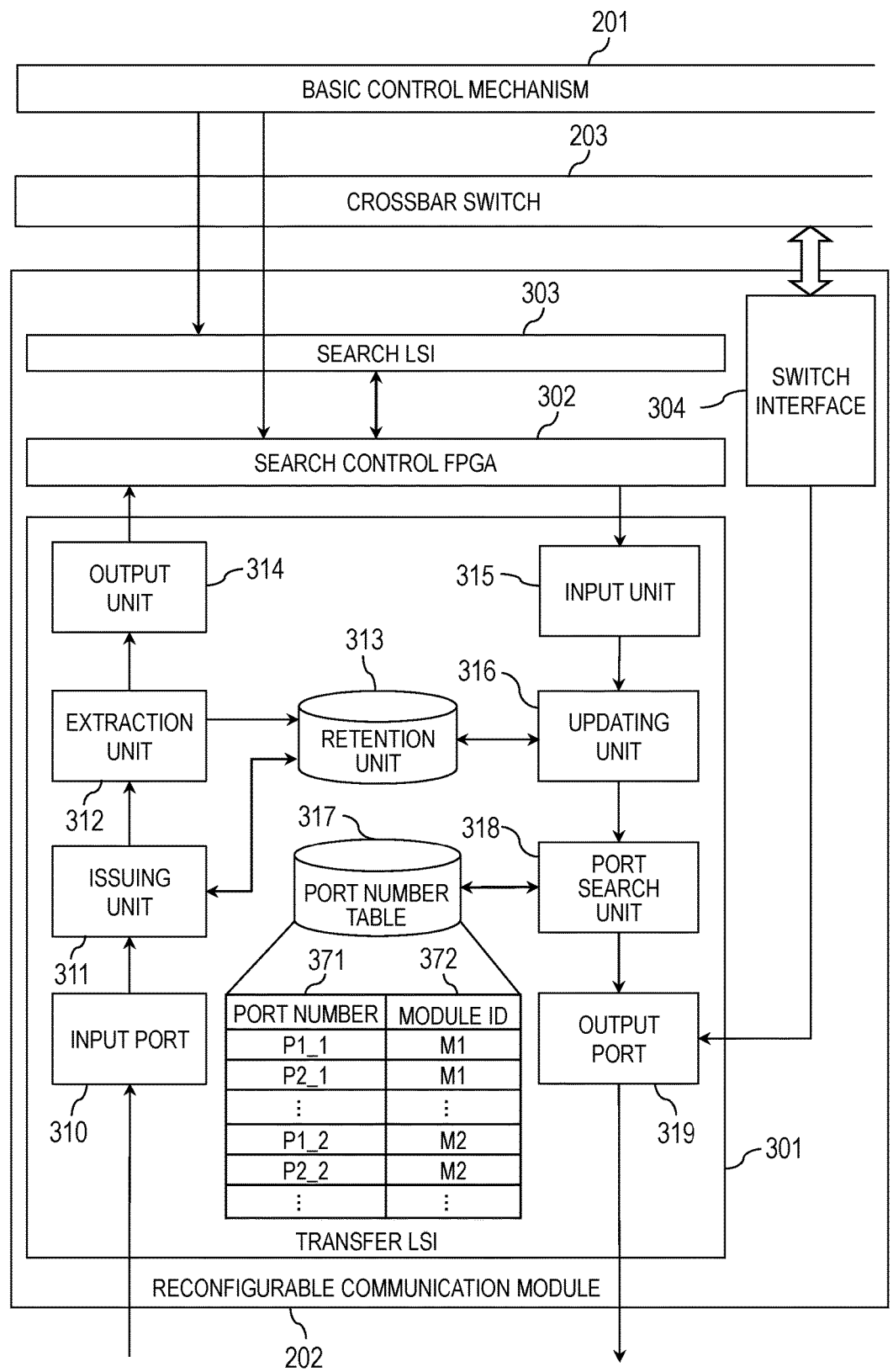
FIG. 3 is a block diagram showing hardware configuration examples of the reconfigurable communication module (including a transfer LSI) according to Embodiment 1.
Figure 4:
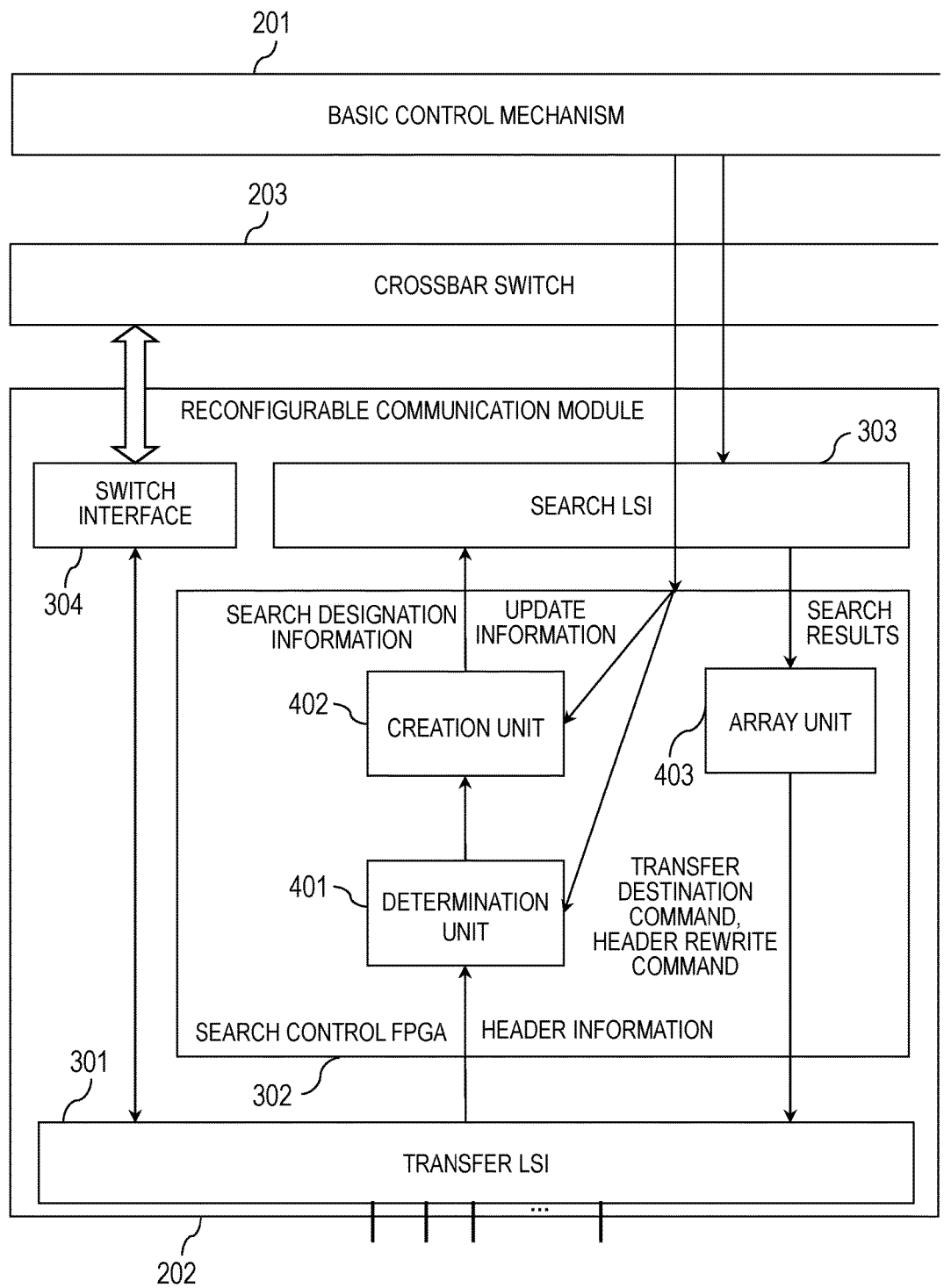
FIG. 4 is a block diagram showing hardware configuration examples of the reconfigurable communication module (including a search control FPGA) according to Embodiment 1.

FIGS. 3 and 4 are block diagrams showing hardware configuration examples of the reconfigurable communication module 202 according to Embodiment 1. In particular, FIG. 3 shows a configuration example of a transfer LSI (large-scale integration) 301 and FIG. 4 shows a configuration example of a search control FPGA (field-programmable gate array) 302.

In FIGS. 3 and 4, the reconfigurable communication module 202 has the transfer LSI 301, the search control FPGA 302, a search LSI 303, and a switch interface (switch IF) 304. The transfer LSI 301 transfers communication data inputted from another transfer device 100 or another reconfigurable communication module 202 within the same transfer device 100 to a destination transfer device 100. Details regarding the transfer LSI 301 will be described later.

The search control FPGA 302 is a module that is reconfigurable in the manner of software or an FPGA. The search control FPGA 302 determines the searching means according to the header format of the communication data, outputs the header to the search LSI 303, and causes the search LSI 303 to search for the transfer destination. Details of the search control FPGA 302 will be described with reference to FIG. 4.

Figure 5:
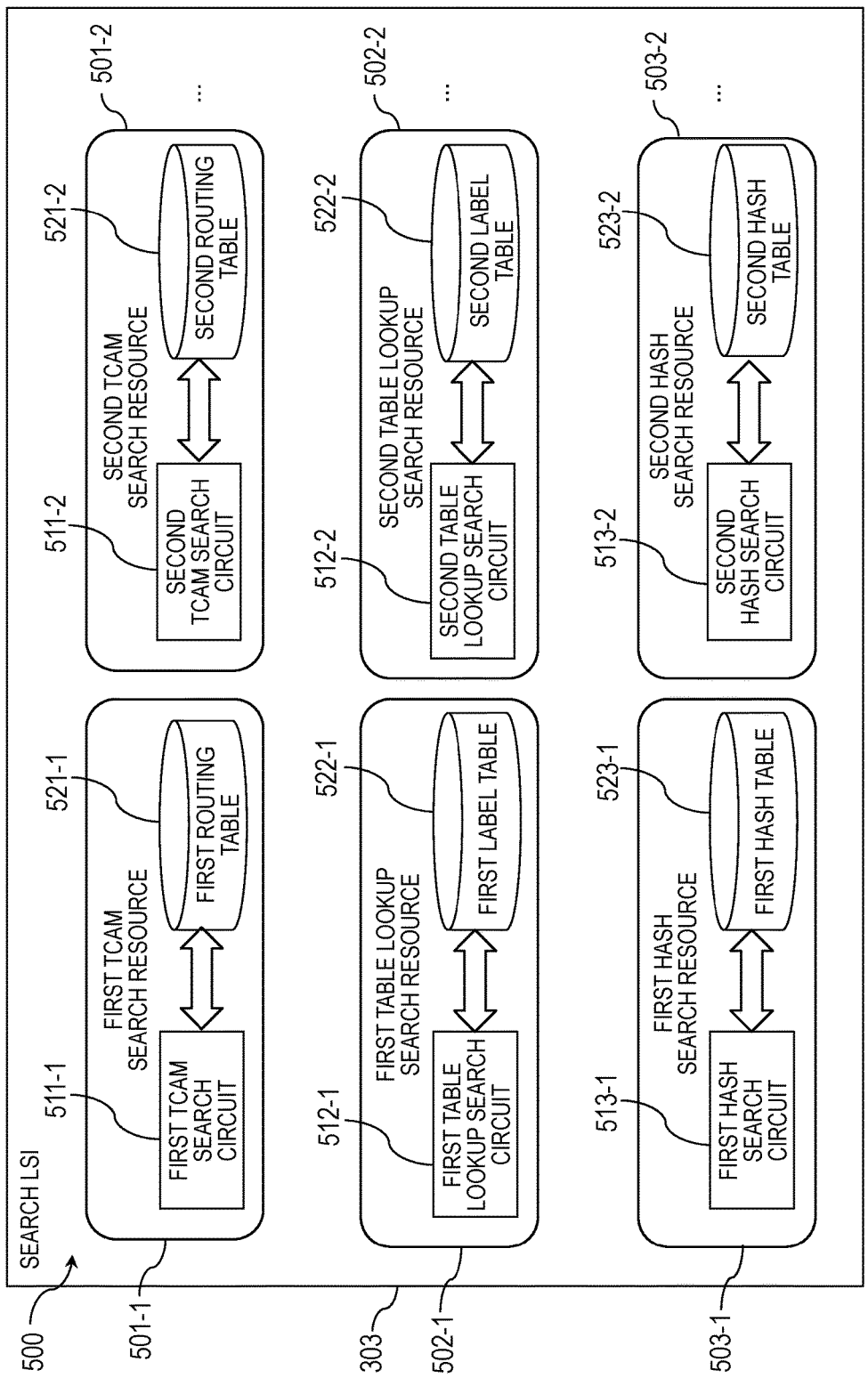
FIG. 5 is a descriptive drawing showing a configuration example of the search LSI according to Embodiment 1.

The search LSI 303 performs searches according to a plurality of header formats. The search LSI 303 is non-reconfigurable hardware in order to achieve high speed search. However, if a new header format emerges, then by combining one or more circuits within the search LSI 303 to handle searches according to the new header format, it is possible to perform a search according to the new header format. Details of the search LSI 303 will be described with reference to FIGS. 5 to 7.

The switch IF 304 is an interface that outputs communication data inputted from the crossbar switch 203 to the transfer LSI 301.

Here, the transfer LSI 301 will be described in detail. The transfer LSI 301 has an input port 310, an issuing unit 311, an extraction unit 312, a retention unit 313, an output unit 314, an input unit 315, an updating unit 316, a port number table 317, a port search unit 318, and an output port 319.

The input port 310 is a port for receiving input of communication data from another transfer device 100.

The issuing unit 311 issues a sequence number indicating the order at which the communication data is received, for each piece of communication data inputted to the input port 310. The sequence number is used in order to reorder the search results in the order at which the search control FPGA 302 issued search designations to the search LSI 303.

The extraction unit 312 extracts headers from communication data. The length of the header to be extracted is set to a fixed length from the head of the communication data regardless of the header format. Alternatively, the length may be set to a length necessary for search of the transfer destination in the case of a specific known format, or a specific fixed length in the case of another format. The extraction unit 312 outputs the extracted header and the sequence number issued by the issuing unit 311 as header information to the output unit 314. Also, the extraction unit 312 outputs the communication data and the sequence number issued by the issuing unit 311 to the retention unit 313.

The retention unit 313 is a storage device that retains a combination of the communication data and the sequence number.

The output unit 314 outputs the header information, which is the combination of the header and the sequence number, to the search control FPGA 302.

The input unit 315 receives the search results from the search LSI 303 through the search control FPGA 302. The search results include destination information according to the format of the header and the sequence number outputted from the output unit 314. In the case of IP (Internet Protocol), for example, the search results include the destination IP address, the transmission port number, and the destination MAC (Media Access Control) address. In the case of MPLS, the search results include the out shim label, the transmission port number, and the destination MAC (Media Access Control) address. In the case of Ethernet ("Ethernet" is a registered trademark; same below), the search results include the transmission port number for transmitting the destination MAC address.

The updating unit 316 identifies communication data corresponding to a sequence number matching the sequence number included in the search results, from the retention unit 313. The updating unit 316 updates the header of the identified communication data using the search results. In the case of IP, for example, the updating unit 316 updates the transmission port number and the destination MAC address. In the case of MPLS, for example, the updating unit 316 updates the out shim label, the transmission port number, and the destination MAC address. In the case of Ethernet, the updating unit 316 updates the transmission port number for transmitting the destination MAC address. The position and length of the above-mentioned header field to be updated is indicated from the search control FPGA 302 through the input unit 315.

The port number table 317 is a table that identifies the reconfigurable communication module 202 to which the port number belongs. Specifically, the port number table 317 is a table in which port numbers 371 and module IDs 372 are associated with each other, for example. The port number 371 is identification information that uniquely identifies the port within the reconfigurable communication module 202 identified by the module ID 372. The module ID 372 is identification information that uniquely identifies the reconfigurable communication module 202.

The port search unit 318 refers to the port number table 317 and identifies the module ID 372 corresponding to the port number 371 updated by the updating unit 316. Also, the port search unit 318 retains the module ID 372 of the installed reconfigurable communication module 202. If the retained module ID 372 matches the module ID 372 identified from the port number table 317, the port search unit 318 outputs the communication data updated by the updating unit 316 to the output port 319 identified by the port number 371.

If the retained module ID 372 does not match the module ID 372 identified from the port number table 317, then the port search unit 318 outputs the communication data to the switch IF 304 so as to output the module ID 372 identified from the port number table 317 to the reconfigurable communication module 202. As a result, the switch IF 304 selects the path, from among a group of paths of the crossbar switch 203, through which to output the module ID 372 identified from the port number table 317 to the reconfigurable communication module 202, and outputs the communication data to the selected path.

The output port 319 transmits the communication data inputted from the port search unit 318 or the switch IF 304 to the destination transfer device 100.

Next, a detailed configuration of the search control FPGA 302 will be described with reference to FIG. 4. The search control FPGA 302 has a determination unit 401, a creation unit 402, and an array unit 403. The determination unit 401 determines a searched header format on the basis of the format of the header included in the header information from the transfer LSI 301. Specifically, the determination unit 401 refers to the Ethernet header type field to determine whether the searched header format is IP, MPLS, or Ethernet, for example. The searched header format is determined by the value of the type field, for example.

The creation unit 402 creates search means designation information according to the searched header format determined by the determination unit 401, and outputs search designation information including search key information and search means designation information to the search LSI 303.

The search key information is a combination of a search key identified by the format of the header from the transfer LSI 301 and the sequence number from the transfer LSI 301. The search key is a field pertaining to the destination in the header. Therefore, the position in the header and the bit width of the search key depends on the format being searched.

If the searched header format is IP, for example, then the search key is a destination IP address included in an IP header. If the searched header format is MPLS, for example, then the search key is an in shim label included in an MPLS header. If the searched header format is Ethernet, for example, then the search key is a destination MAC address included in an Ethernet header.

The search means is one or more search resources necessary for a search process configured by reconfiguration of the search LSI 303 during manufacturing or after shipping. The search resource is a combination of a table and a search circuit. If the searched header format is IP, for example, then the search circuit group constituting the search means is a TCAM (Ternary CAM) search circuit (first resource) and a hash search circuit (second resource). If the searched header format is MPLS, then the search circuit group constituting the search means is a table lookup search circuit (first resource) and a hash search circuit (second resource). If the searched header format is Ethernet, then the search circuit group constituting the search means is a hash search circuit (first resource only).

The array unit 403 receives the search results from the search LSI 303 and arranges the search results in the order of the sequence numbers included in the search results. The array unit 403 outputs the transfer destination information excluding the sequence number from the search results to the transfer LSI 301 in the array order.

The bit width of the sequence number issued by the issuing unit 311 is 10 bits, for example. The number of bits is set to a value greater than the maximum number of pieces of communication data for which a search is in progress in the search LSI 303. If, for example, the number of pieces of communication data for which a search is in progress in the search LSI 303 is less than 1024 ($2^{10}$), the bit width of the sequence number is set to 10 bits or greater. In this manner, it is possible to identify the order of all pieces of communication data for which a search is being performed in the search LSI 303.

Configuration Example of Search LSI 303

FIGS. 5 to 8 are descriptive drawings showing a configuration example of the search LSI 303 according to Embodiment 1. An explanation with focus on a search resource pool 500 in the search LSI 303 will be made with reference to FIG. 5. The search LSI 303 has the search resource pool 500. The search resource pool 500 is a collection of search resources. The search resources are a combination of search circuits and storage devices (such as RAM) that store tables accessible by the search circuits.

A TCAM search resource 501 (collectively referring to 501-1, 501-2 . . . ) is a component of the search means used when the searched header format is IP. The TCAM search resource 501 is a combination of a TCAM search circuit 511 (collectively referring to 511-1, 511-2 . . . ) and a routing table 521 (collectively referring to 521-1, 521-2 . . . ) stored in a TCAM accessible by the TCAM search circuit 511. The TCAM search circuit 511 performs a longest-match search of the routing table 521. The routing table 521 is a table learned in advance by the basic control mechanism 201. The routing table 521 is a table that associates a transmission port number and next hop IP for transmitting the communication data to the destination IP address, with the destination IP address, which is the search key. The next hop IP is an IP address of the destination transfer device 100.

One or more TCAM search resources 501 are created. The TCAM search resource 501 is specifically created per bit width of the destination IP address that is the search key, for example. If the searched header format is IPv4, for example, then the bit width of the destination IP address is 32 bits. Thus, the TCAM search circuit 511-1 of a first TCAM search resource 501-1 is a longest-match search circuit for a bit width of 32 bits, and the bit width of the search key of a first routing table 521-1 is 32 bits. Similarly, if the searched header format is IPv6, for example, then the bit width of the destination IP address is 128 bits. Thus, the TCAM search circuit 511-2 of a second TCAM search resource 501-2 is a longest-match search circuit for a bit width of 128 bits, and the bit width of the search key of a second routing table 521-2 is 128 bits. In order to handle any future IPvx (x being the version), unused 256-bit and 512-bit TCAM search resources 501 are provided.

In a longest-match search by the TCAM search circuit 511, the host address of the search key is a "don't care" value, and thus, the number of entries in the routing table 521 is not $2^{32}$ as in table lookup but is reduced to the number of paths. Therefore, it is possible to reduce the amount of memory used compared to table lookup. Also, as a result, the memory space for storing unused TCAM search resources 501 can also be ensured.

A table lookup search resource 502 (collectively referring to 502-1, 502-2 . . . ) is a component of the search means used when the searched header format is MPLS. The table lookup search resource 502 is a combination of a table lookup search circuit 512 (collectively referring to 512-1, 512-2 . . . ) and a label table 522 (collectively referring to 522-1, 522-2 . . . ) stored in RAM accessible by the table lookup search circuit 512. The table lookup search circuit 512 searches the label table 522. The label table 522 is a table learned in advance by the basic control mechanism 201. The label table 522 is a table in which the out shim label, the transmission port number, and the next hop IP are associated with the in shim label that is the search key.

One or more table lookup search resources 502 are created. The table lookup search resource 502, similar to the TCAM search resource 501, is specifically created per bit width of the search key, for example. In order to handle any future formats, unused table lookup search resources 502 where the search key has a bit width of 21 bits to 31 bits are provided. In this manner, it is possible to reduce memory usage compared to a search by table lookup using 32-bit width search keys. Also, as a result, the memory space for storing unused table lookup search resources 502 (not limited to MPLS) can also be ensured.

A hash search resource 503 (collectively referring to 503-1, 503-2 . . . ) is a component of the search means used when the searched header format is IP, MPLS, or Ethernet. The hash search resource 503 is a combination of a hash search circuit 513 (collectively referring to 513-1, 513-2 . . . ) and a hash table 523 (collectively referring to 523-1, 523-2 . . . ) stored in RAM accessible by the hash search circuit 513. The hash search circuit 513 converts the destination MAC address that is the search key to a hash value using a hash function, and the hash value is used to search the hash table 523. The hash table 523 is a table set in advance by the basic control mechanism 201. The hash table 523 is a table in which the transmission port number is associated with the hash value.

One or more hash search resources 503 are created. The hash search resource 503, similar to the TCAM search resource 501, is specifically created per bit width of the hash value, for example. In order to handle any future formats, unused hash search resources 503 where the bit width is 9 bits to 47 bits are provided. In this manner, it is possible to reduce memory usage compared to a search by table lookup using a 48-bit width destination MAC address as is, without using a hash value. Also, as a result, the memory space for storing unused hash search resources 503 can also be ensured.

Figure 6:
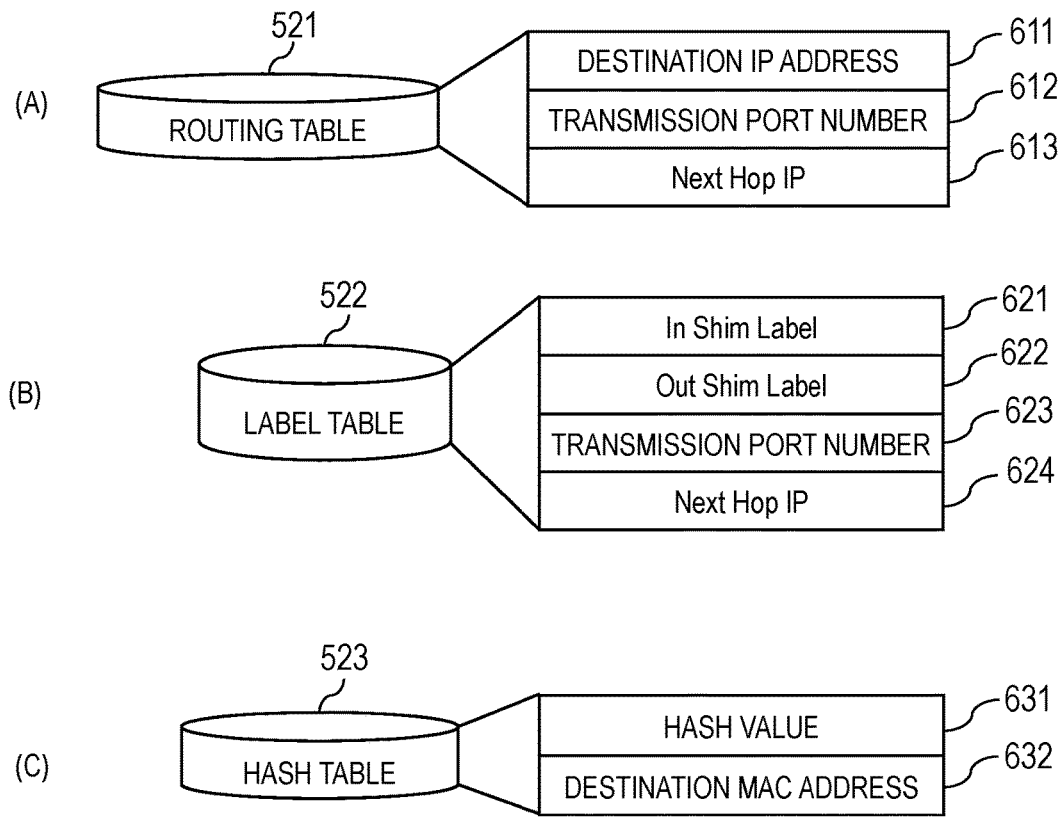
FIG. 6 is a descriptive drawing showing a data structure example of a table according to Embodiment 1.

FIG. 6 is a descriptive drawing showing a data structure example of a table according to Embodiment 1. (A) is the routing table 521. The routing table 521 is a table stored in the TCAM to be accessed by the TCAM search circuit 511. The routing table 521 is a table into which the basic control mechanism 201 stores a transmission port number 612 and a next hop IP 613 corresponding to a destination IP address 611. The destination IP address 611 is the key value, that is, the search key.

(B) is a label table 522. The label table 522 is a table stored in the RAM to be accessed by the table lookup search circuit 512. The label table 522 is a table into which the basic control mechanism 201 stores an out shim label 622, a transmission port number 623, and a next hop IP 624 corresponding to an in shim label 621. The in shim label 621 is the key value, that is, the search key.

(C) is a hash table 523. The hash table 523 is a table stored in the RAM to be accessed by the hash search circuit 513. The hash table 523 is a table in which the destination MAC address 632 associated with the hash value 631 is set by the basic control mechanism 201. The hash value 631 is the key value, that is, the search key.

Figure 7:
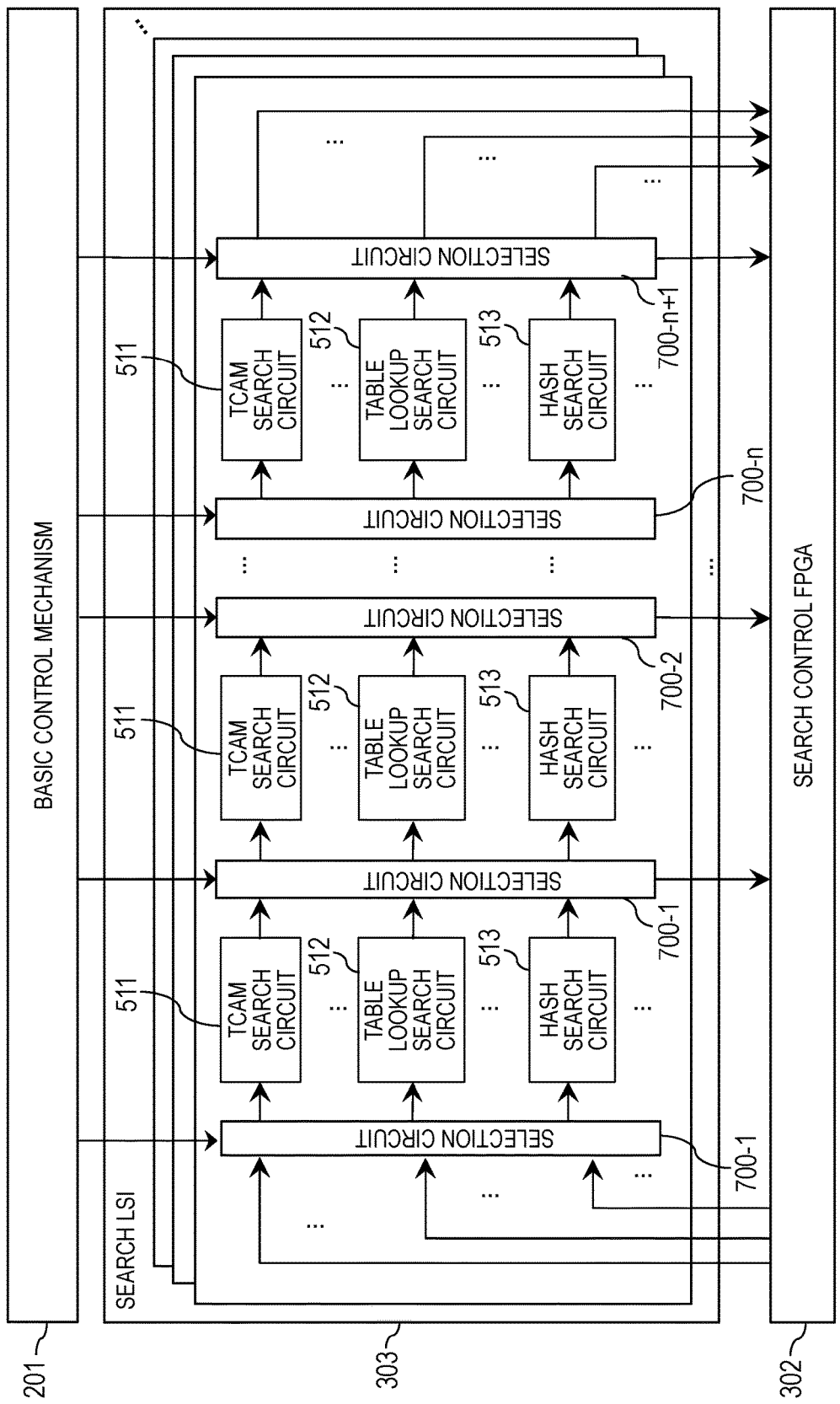
FIG. 7 is a block diagram showing a hardware configuration example of the search LSI according to Embodiment 1.

FIG. 7 shows a hardware configuration example of the search LSI 303 according to Embodiment 1. The search LSI 303 has, for each combination of the bit width of the destination IP address and the bit width of the destination MAC address, a unit having a selection circuit 700 (collectively referring to 700-1, 700-2 . . . ), the TCAM search circuit 511, the table lookup search circuit 512, and the hash search circuit 513. FIG. 7 omits the storage device accessible by each search circuit. In each unit, the TCAM search circuit 511, the table lookup search circuit 512, and the hash search circuit 513 aligned vertically are referred to as the ith (1≤i≤n) search circuit group. The selection circuit 700 immediately before the ith search circuit group is the ith (1≤i≤n+1) selection circuit 700. The search LSI 303 uses the selection circuit 700 to select the search circuit number or the search circuit used in the ith search circuit group according to settings from the basic control mechanism 201. The i+1th selection circuit 700 is also the circuit selecting the output of the ith search circuit group.

Figure 8:
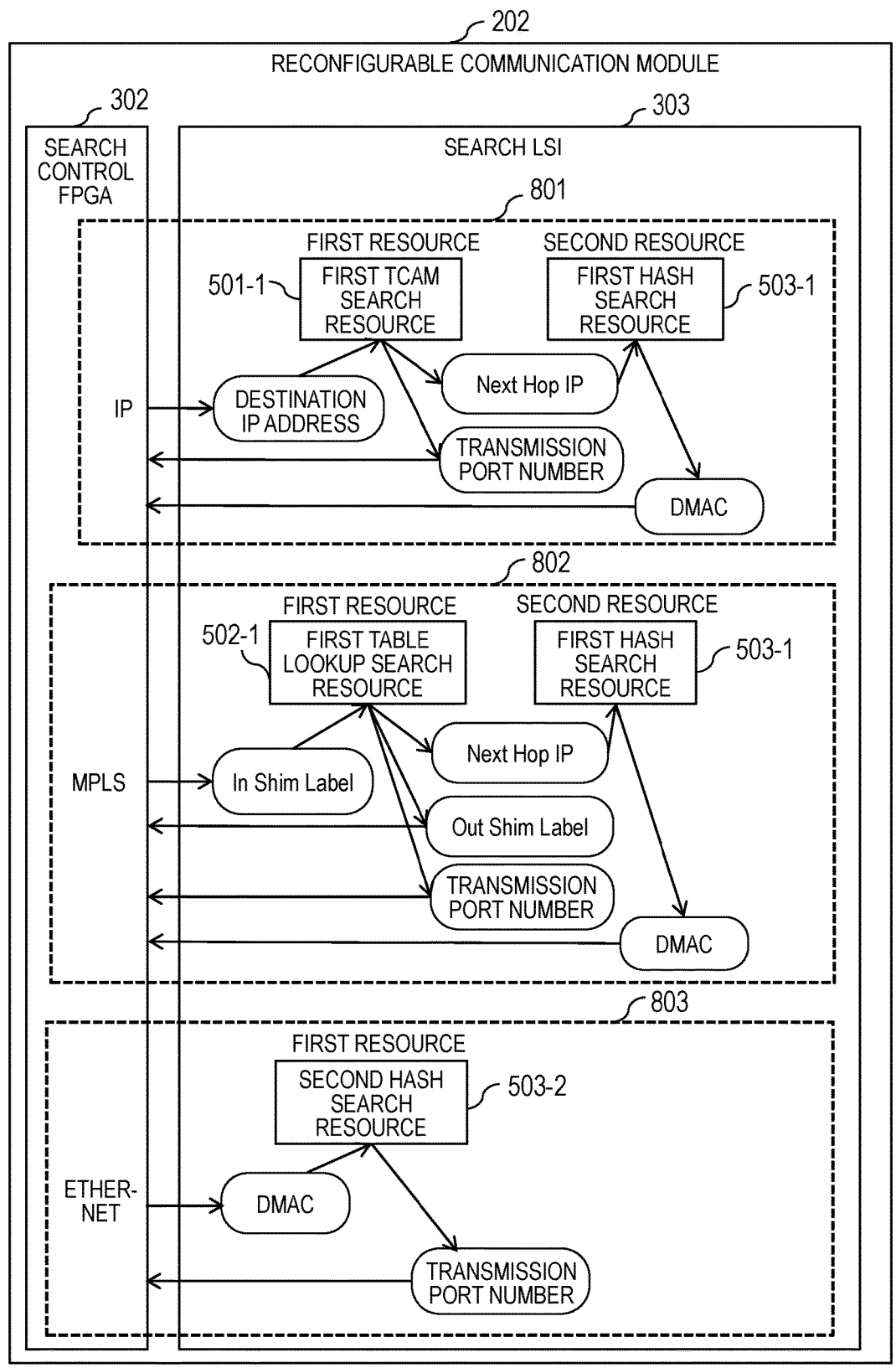
FIG. 8 is a block diagram showing a search means created in the search LSI for each searched header format according to Embodiment 1.

FIG. 8 shows a search means created in the search LSI 303 for each searched header format according to Embodiment 1. An IP search means 801 is a search means for when the searched header format is IPv4. The bit width of the destination IP address differs between IPv4 and IPv6, and thus, different IP search means 801 are used. Here, as an example, use of IP over Ethernet is assumed. The IP search means 801 is a search means in which the first resource is the first TCAM search resource 501-1 and the second resource is a first hash search resource 503-1. The IP search means 801 acquires the destination IP address from the search control FPGA 302, and uses the first TCAM search resource 501-1 to acquire the transmission port number and the next hop IP. The IP search means 801 returns the transmission port number to the search control FPGA 302 as the search results and outputs the next hop IP to the first hash search resource 503-1. The IP search means 801 uses the first hash search resource 503-1 to convert the next hop IP to a hash value, acquires the destination MAC address from the hash table 523, and returns the destination MAC address to the search control FPGA 302 as the search results.

An MPLS search means 802 is a search means for when the searched header format is MPLS. Here, as an example, use of MPLS over Ethernet is assumed. The MPLS search means 802 is a search means in which the first resource is a first table lookup search resource 502-1 and the second resource is a first hash search resource 503-1. The MPLS search means 802 acquires the in shim label from the search control FPGA 302, and uses the first table lookup search resource 502-1 to acquire the out shim label, the transmission port number, and the next hop IP. The MPLS search means 802 returns the out shim label and the transmission port number to the search control FPGA 302 as the search results and outputs the next hop IP to the first hash search resource 503-1. The MPLS search means 802 uses the first hash search resource 503-1 to convert the next hop IP to a hash value, acquires the destination MAC address from the hash table 523, and returns the destination MAC address to the search control FPGA 302 as the search results.

An Ethernet search means 803 is a search means for when the searched header format is Ethernet. Here, as an example, use of Layer 2 Forwarding is assumed, and header formats for Layer 3 and greater do not affect the search results. The Ethernet search means 803 is a search means in which the first resource is a second hash search resource 503-2. The Ethernet search means 803 acquires the destination MAC address from the search control FPGA 302, and uses the second hash search resource 503-2 to acquire the transmission port number. The Ethernet search means 803 returns the transmission port number to the search control FPGA 302 as the search results.

Search Designation Information

Figure 9:
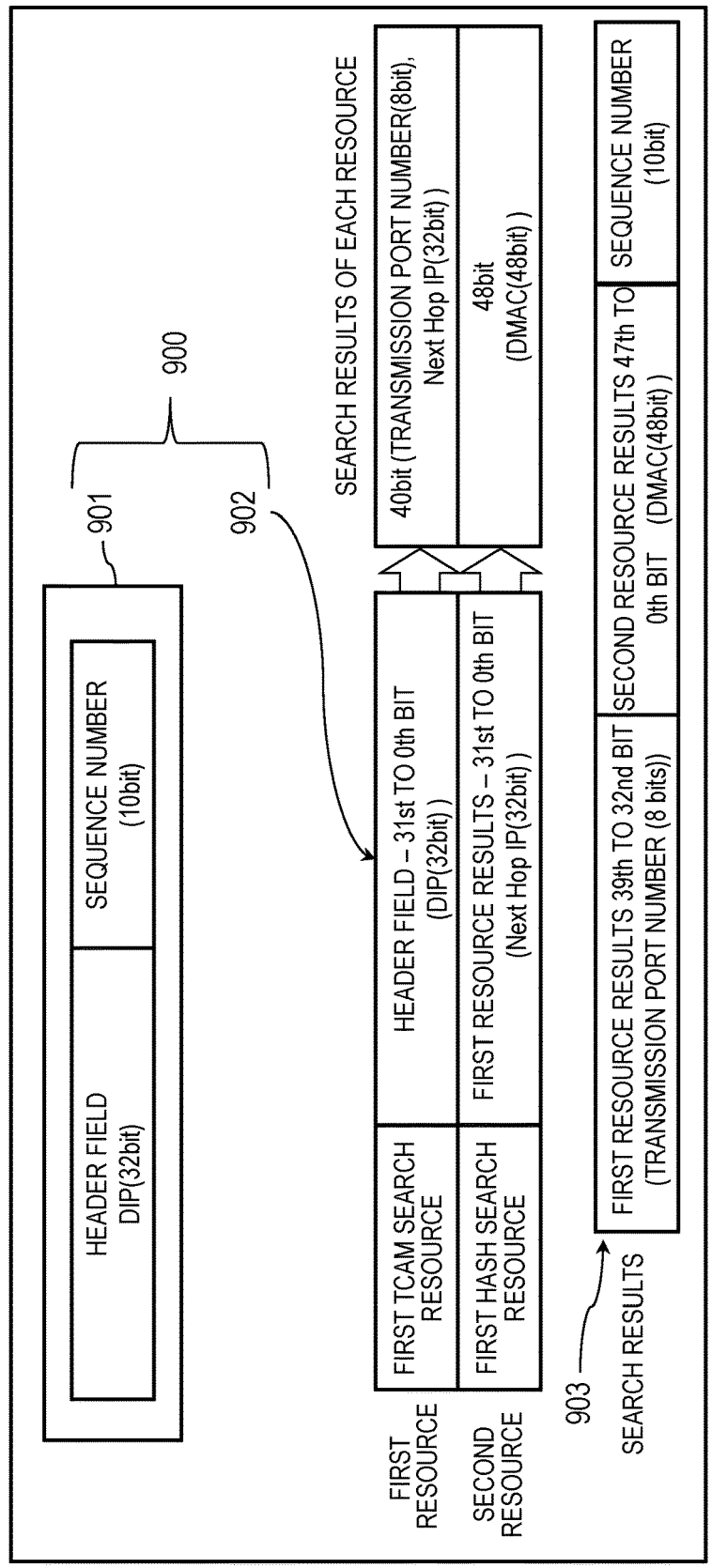
FIG. 9 is a descriptive drawing showing an example of IP search designation information of Embodiment 1.
Figure 10:
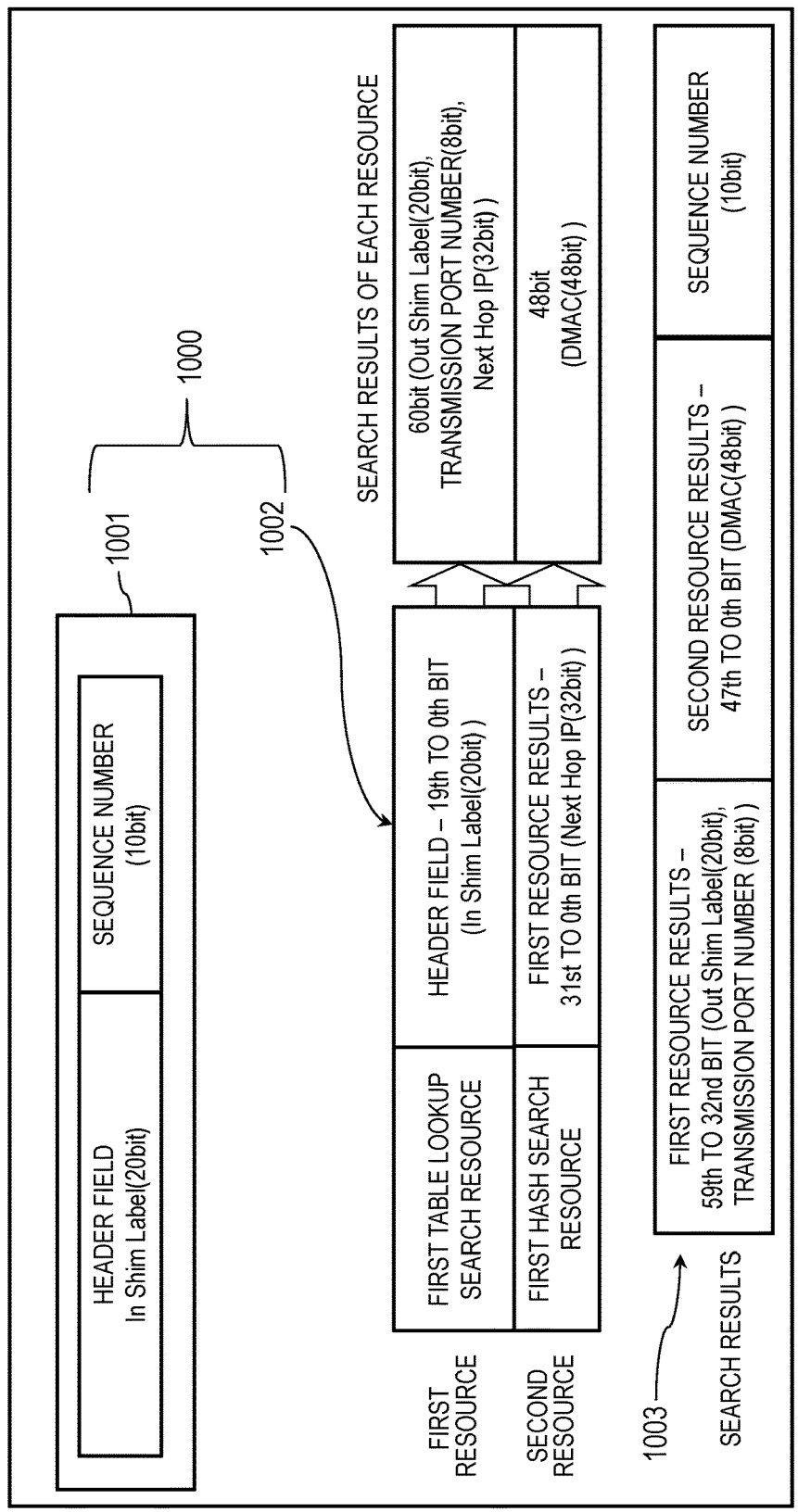
FIG. 10 is a descriptive drawing showing an example of MPLS search designation information of Embodiment 1.
Figure 11:
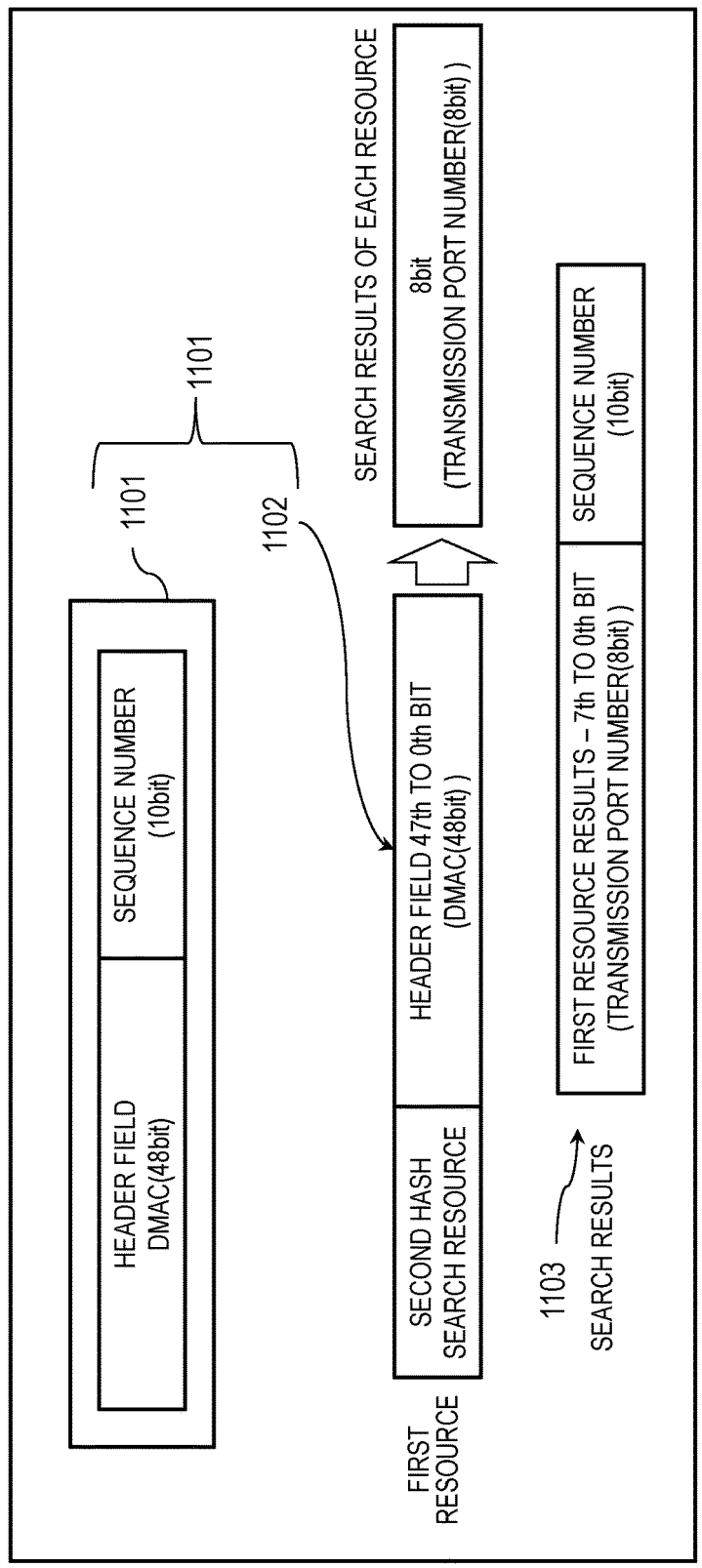
FIG. 11 is a descriptive drawing showing an example of Ethernet search designation information of Embodiment 1.

FIGS. 9 to 11 are descriptive drawings, each showing an example of the search designation information of Embodiment 1. FIG. 9 shows IP search designation information 900 for IPv4, FIG. 10 shows MPLS search designation information 1000, and FIG. 11 shows Ethernet search designation information 1100. In the explanation below, in counting the bit position, the lowest bit is indicated as the 0th bit, and the bit number increases for higher bits. As described above, the search LSI 303 is constituted of a general use search resource pool 500, and does not detect the specific field used as the search key and the field attained as the search results.

In FIG. 9, the IP search designation information 900 includes IP search key information 901, and IP search means designation information 902. The IP search key information 901 includes a header field (32 bits) of the destination IP address to be the search key, and the sequence number (10 bits). The IP search means designation information 902 is information designating the IP search means 801. As shown in FIG. 8, the IP search means 801 is a search means in which the first resource is the first TCAM search resource 501-1 and the second resource is a first hash search resource 503-1. The search key in the first TCAM search resource 501-1, which is the first resource, is the header field (31st to 0th bit) of the 32-bit destination IP address. The search results of the first TCAM search resource 501-1 using the search key are a 40-bit array. The 31st to 0th bit of the bit array constitute the next hop IP, and the 39th to 32nd bit constitute the transmission port number.

The search key in the first hash search resource 503-1, which is the second resource, is the bit array of the 31st to 0th bits of the first resource search results, that is, the next hop IP. The search results of the first hash search resource 503-1 using the search key are a 48-bit destination MAC address.

In FIG. 10, the MPLS search designation information 1000 includes MPLS search key information 1001, and MPLS search means designation information 1002. The MPLS search key information 1001 includes a header field (20 bits) of the in shim label to be the search key, and the sequence number (10 bits). As shown in FIG. 8, the MPLS search means designation information 1002 is a search means in which the first resource is the first table lookup search resource 502-1 and the second resource is the first hash search resource 503-1. The search key in the first table lookup search resource 502-1, which is the first resource, is the header field (19th to 0th bit) of the 20-bit in shim label. The search results of the first table lookup search resource 502-1 using the search key are a 60-bit array. The 31st to 0th bit of the bit array constitute the next hop IP, the 39th to 32nd bit constitute the transmission port number, and the 59th to 40th bit constitute the out shim label.

The search key in the first hash search resource 503-1, which is the second resource, is the bit array of the 31st to 0th bits of the first resource search results, that is, the next hop IP. The search results of the first hash search resource 503-1 using the search key are a 48-bit destination MAC address.

In FIG. 11, the Ethernet search designation information 1100 includes Ethernet search key information 1101, and Ethernet search means designation information 1102. The Ethernet search key information 1101 includes a header field (48 bits) of the destination MAC address to be the search key, and the sequence number (10 bits). As shown in FIG. 8, the Ethernet search means designation information 1102 is a search means in which there is only the first resource, which is the second hash search resource 503-2. The search key in the second hash search resource 503-2 is the header field (47th to 0th bit) of the 48-bit destination MAC address. The search results of the second hash search resource 503-2 using the search key are an 8-bit array. The 7th to 0th bit of the bit array constitute the transmission port number.

Configuration Example of Basic Control Mechanism 201

Figure 12:
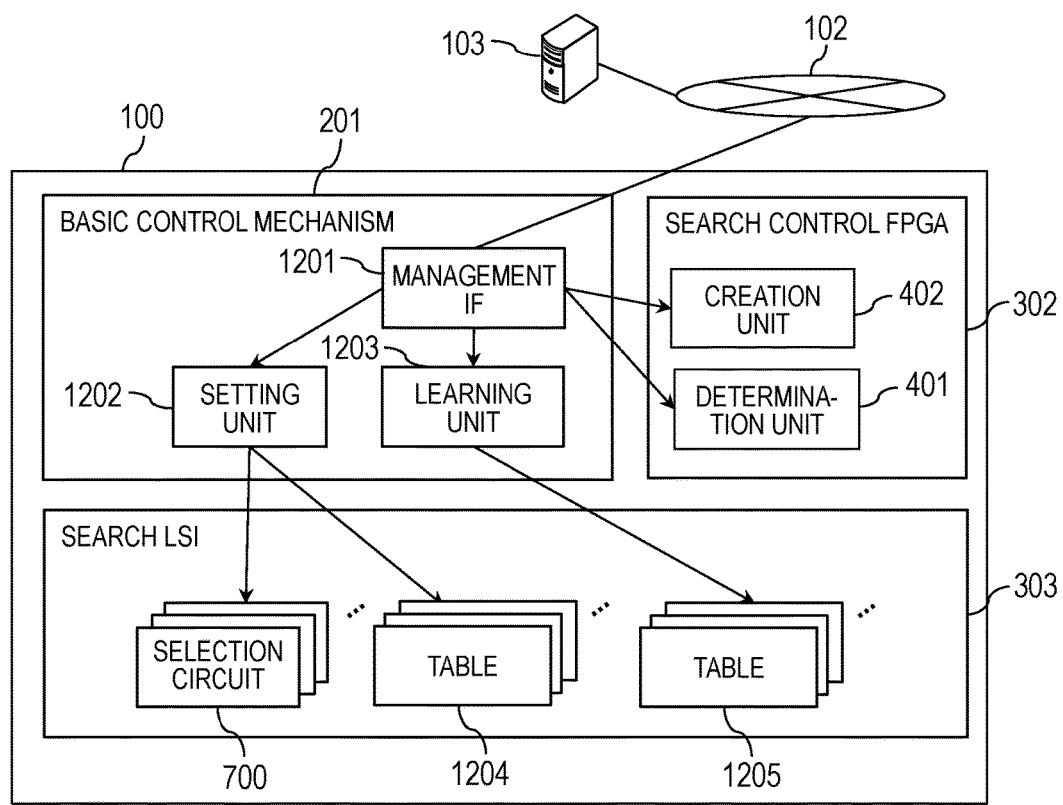
FIG. 12 is a block diagram showing a configuration example of the basic control mechanism according to Embodiment 1.

FIG. 12 is a block diagram showing a configuration example of the basic control mechanism 201 according to Embodiment 1. The basic control mechanism 201 may be constituted of an LSI or may be constituted of a reconfigurable FPGA or software. The basic control mechanism 201 has a management IF 1201, a setting unit 1202, and a learning unit 1203. The management IF 1201 acquires update information from the management server 103. The setting unit 1202 sets the hash table 523 using an unused table 1204, and creates a search means in the search LSI 303. The learning unit 1203 learns the path using an unused table 1205, and generates a routing table 521 that retains the learning results. Also, the basic control mechanism 201 outputs the update information to the search control FPGA 302 as well, and updates the determination unit 401 and the creation unit 402 in the search control FPGA 302.

The update information is information necessary to reconfigure the transfer device 100 in order to perform transfer for header formats that have newly appeared after shipping of the product. Specifically, in the case of a new version of an existing header format such as a new version of an IP header format, for example, the update information includes the bit width of the header field of the destination IP address and components of the IP search means 801 corresponding to the bit width of the new version.

When the basic control mechanism 201 acquires the update information through the management IF 1201, the learning unit 1203 selects an unused table according to the bit width of the header field of the destination IP address for the new version of the IP header format, learns the destination IP address, the transmission port number, and the next hop IP, and creates the routing table 521.

Also, the basic control mechanism 201 uses the setting unit 1202 to set components of the IP search means 801 included in the update information. Specifically, the setting unit 1202 controls the selection circuit 700 so as to select at least one of the TCAM search circuit 511, the table lookup search circuit 512, and the hash search circuit 513 that can be controlled according to the bit width of the search key, and then create a new version of the IP search means 801 in the search LSI 303.

Also, the search control FPGA 302 updates the determination unit 401. Specifically, for example, if communication data having a new version of the IP header format is received, then the search control FPGA 302 adds to the determination unit 401 a process of determining the new version of the IP header format according to features of the header type. Also, the search control FPGA 302 updates the creation unit 402. Specifically, for example, if the header of the communication data is determined to be in a new version of the IP header format, the search control FPGA 302 determines the position and bit width of the field to be the search key from the new version of the IP header format, and adds to the creation unit 402 a process of extracting the search key and a process of creating search means designation information for selecting the IP search means 801 of the new version.

Also, in the case of a new header format, the update information includes the bit width of the search key and the components of the search means.

When the basic control mechanism 201 acquires the update information through the management IF 1201, the learning unit 1203 selects the unused table 1205 according to the bit width of the search key in the new header format, and learns the search key and the search results corresponding to the search key.

Also, the basic control mechanism 201 uses the setting unit 1202 to set components of the search means included in the update information. Specifically, the setting unit 1202 controls the selection circuit 700 so as to select at least one of the TCAM search circuit 511, the table lookup search circuit 512, and the hash search circuit 513 that can be controlled according to the bit width of the search key, and then create a search means in the new header format in the search LSI 303.

Also, the search control FPGA 302 updates the determination unit 401. Specifically, for example, if communication data having a new header format is received, then the search control FPGA 302 adds to the determination unit 401 a process of determining the new header format according to features of the header type. Also, the search control FPGA 302 updates the creation unit 402. Specifically, for example, if the header of the communication data is determined to be in a new header format, the search control FPGA 302 determines the position and bit width of the field to be the search key from the new header format, and adds to the creation unit 402 a process of extracting the search key and a process of creating search means designation information for selecting the search means of the new header format.

The following hypothetical situation supposes that the transfer device 100 has been shipped prior to the emergence of MPLS. If the search process and transfer process in the MPLS header format were to be installed in the transfer device 100, the update information includes the position in the header and the bit width of the in shim label to be the search key, the position in the header and the bit width of the out shim label to be the search results, the position in the header and the bit width of the transmission port number, the position in the header and the bit width of the next hop IP, and information to select the table lookup search circuit 512 (first resource) corresponding to the bit width of the in shim label as a component of the search means, and the hash search circuit 513 (second resource) that converts the bit array of the bit width of the next hop IP to a hash value.

The basic control mechanism 201 receives the update information through the management IF 1201, and uses the table to associate, with the in shim label, the out shim label that is the label of the destination transfer device 100, the transmission port number to be transmitted to the destination transfer device 100, and the next hop IP that is the IP address of the destination transfer device 100, to create a label table 522.

Also, the basic control mechanism 201 uses the setting unit 1202 to set components of the search means included in the update information. Specifically, the setting unit 1202 controls the selection circuit 700 so as to select the table lookup search circuit 512 (first resource) that can be controlled according to the bit width of the in shim label, and the hash search circuit 513 (second resource) that converts the bit array of the bit width of the next hop IP to a hash value, and then creates the MPLS search means 802 in the search LSI 303.

Also, the search control FPGA 302 updates the determination unit 401. Specifically, for example, if communication data having an MPLS header format is received, then the search control FPGA 302 adds to the determination unit 401 a process of determining the MPLS header format according to features of the header type. Also, the search control FPGA 302 updates the search designation information creation unit 402. Specifically, for example, if the header of the communication data is determined to be in the MPLS header format, the search control FPGA 302 determines the position and bit width of the field to be the search key from the MPLS header format, and adds to the search designation information creation unit 402 a process of extracting the search key and a process of creating search designation information for selecting the MPLS search means 802.

Example of Search Control Process Steps

Figure 13:
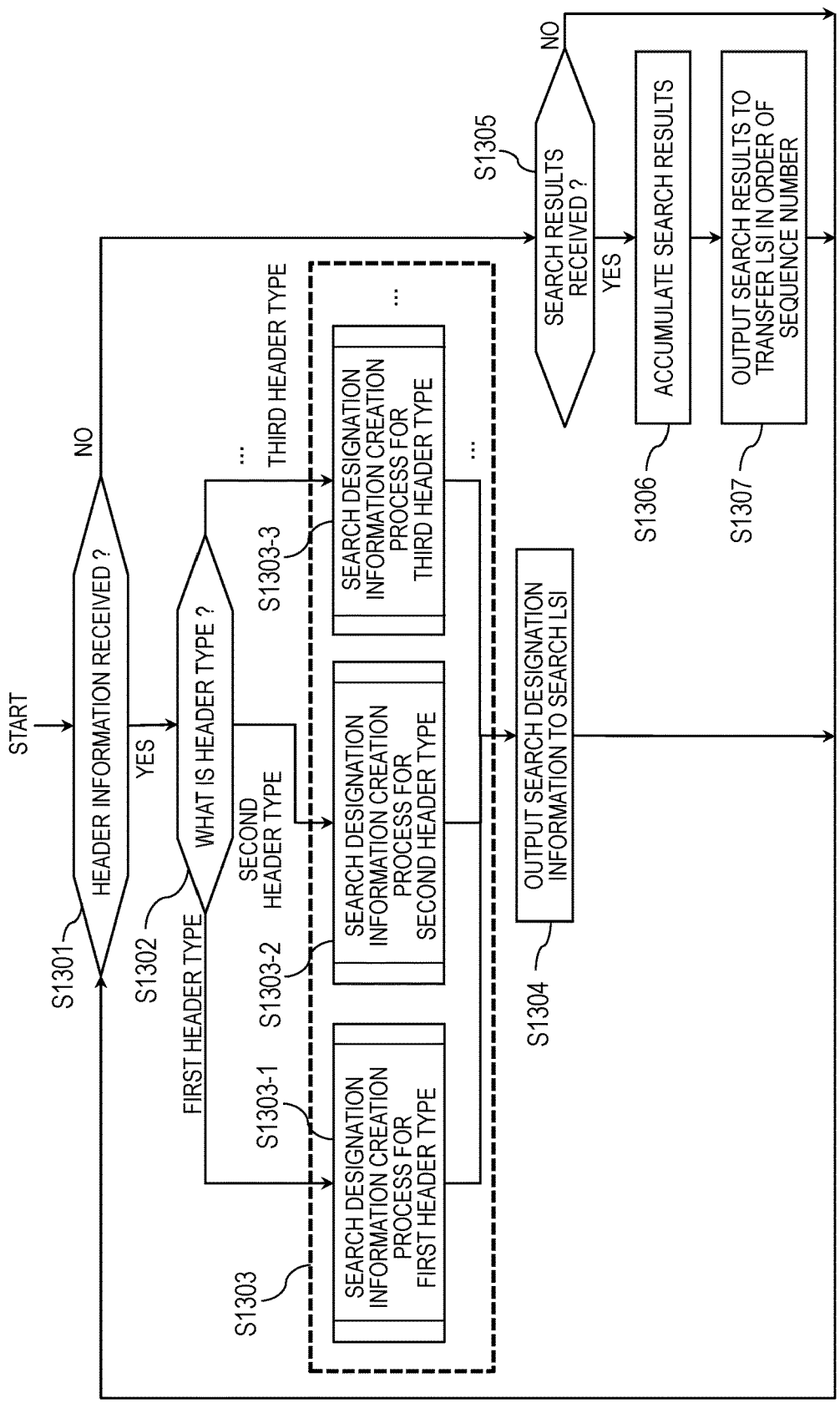
FIG. 13 is a flowchart showing an example of search control steps by the search control FPGA according to Embodiment 1.

FIG. 13 is a flowchart showing an example of search control steps by the search control FPGA 302 according to Embodiment 1. If header information is received from the transfer LSI 301 (step S1301: yes), then the search control FPGA 302 progresses to step S1302, and if the header information is not received (step S1301: no), then the search control FPGA 302 progresses to step S1305.

The search control FPGA 302 uses the determination unit 401 to determine the header type (first header type, second header type, third header type; below, a given header type will be referred to as an ith header type (i=1, 2, 3, etc.)) of the header included in the header information, and outputs the determination results to the creation unit 402 (step S1302). In the case of the present example, the first header type is the IPv4 header format, the second header type is the MPLS header format, and the third header type is the Ethernet header format. The search control FPGA 302 uses the creation unit 402 to execute a search designation information creation process according to the determination results (step S1303). Specifically, for example, in the search designation information creation process pertaining to the ith header type (step S1303-*i*), search means designation information that designates the search means corresponding to the ith header type is generated, and the position in the header and the bit width of the search key corresponding to the ith header type are identified and associated with the sequence number to form the search key information. As a result, the search designation information is created.

Then, the search control FPGA 302 outputs to the search LSI 303 (step S1304) the search designation information created in the search designation information creation process (step S1303), and returns to step S1301.

The search control FPGA 302 stands by for reception of the search results from the search LSI 303 (step S1305), and if search results are not received (step S1305: no), then the search control FPGA 302 returns to step S1301. On the other hand, if the search results are received (step S1305: yes), then the search control FPGA 302 uses the array unit 403 to accumulate the search results and reorder them in the order of the sequence numbers (step S1306), outputs the search results in the order of the sequence numbers to the transfer LSI 301 (step 1307), and returns to step S1301.

If a new header format emerges after product shipment, then step S1302 is updated according to the update information, and a search designation information creation process for the new header format is added to step S1303.

Example of Transfer Process Steps by Transfer LSI 301

Figure 14:
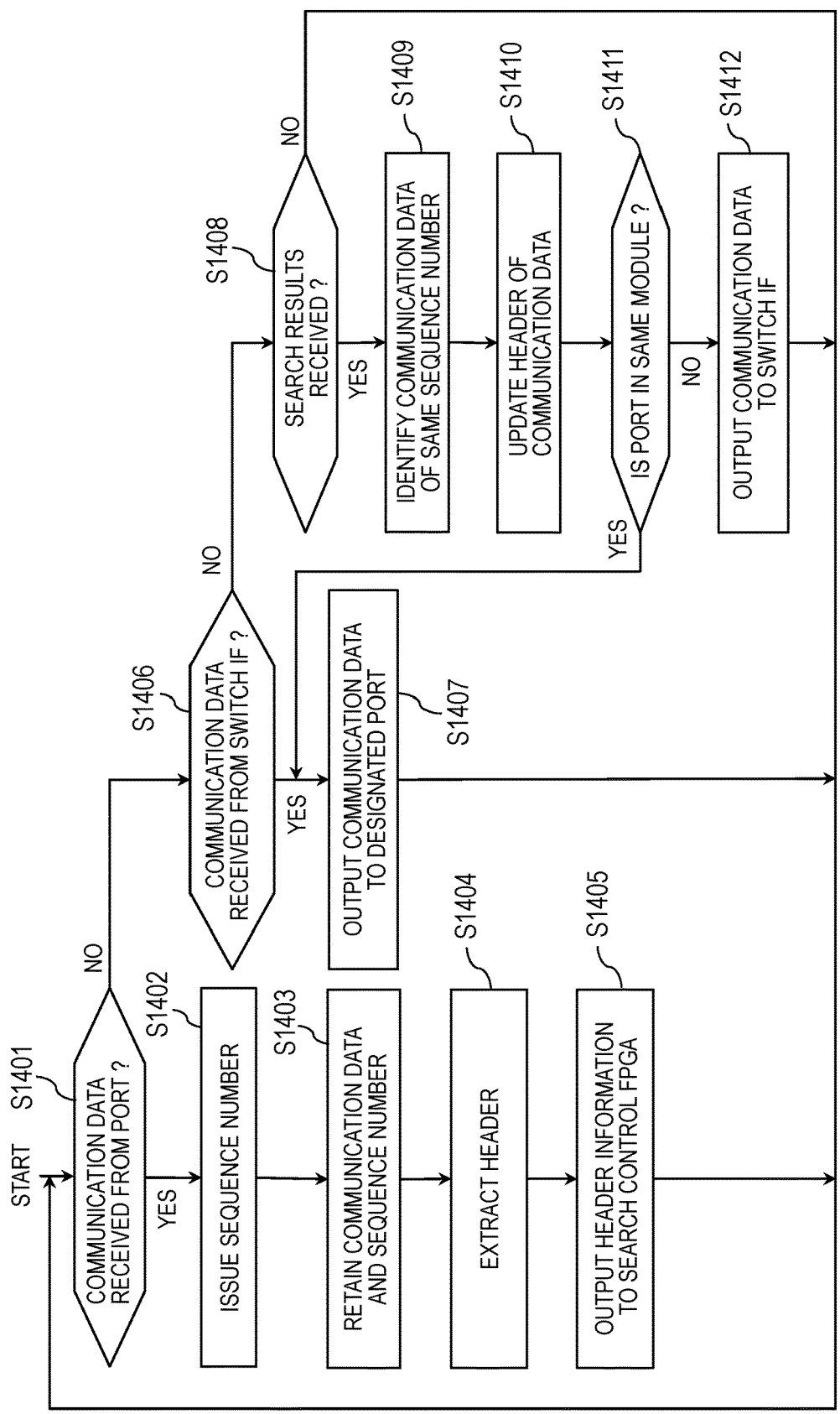
FIG. 14 is a flowchart showing an example of transfer process steps by the transfer LSI according to Embodiment 1.

FIG. 14 is a flowchart showing an example of transfer process steps by the transfer LSI 301 according to Embodiment 1. If communication data from the input port 310 is received (step S1401: yes), the transfer LSI 301 uses the issuing unit 311 to issue a sequence number (step S1402). The transfer LSI 301 retains the combination of the communication data and the sequence number in the retention unit 313 (step S1403). The transfer LSI 301 uses the extraction unit 312 to extract headers from communication data (step S1404). The transfer LSI 301 outputs the header information, which is the combination of the extracted header and the sequence number, to the search control FPGA 302 (step S1405). Thereafter, the process returns to step S1401.

If the communication data has not been received from the input port 310 (step S1401: no), then if the transfer LSI 301 has received the communication data from the switch IF 304 (step S1406: yes), the communication data received by the switch IF 304 is outputted to the port designated by the transmission port number in the header (step S1407). Thereafter, the process returns to step S1401.

If communication data has not been received from the switch IF 304 (step S1406: no), then if search results have not been received from the search control FPGA 302 (step S1408: no), then the process returns to step S1401.

On the other hand, if search results have been received from the search control FPGA 302 (step S1408: yes), then the transfer LSI 301 refers to the retention unit 313 and determines the communication data associated with the same sequence number as that included in the search results (step S1409). The transfer LSI 301 updates the header of the identified communication data using the search results (step S1410). If the transmission port number of the header after updating is in the same module (step S1411: yes), the process progresses to step S1407, and the transfer LSI 301 outputs the communication data to the port designated by the transmission port number inside the header (step S1407). Thereafter, the process returns to step S1401.

On the other hand, if the transmission port number of the header after updating is not in the same module (step S1411: no), the transfer LSI 301 outputs the communication data to the switch IF 304 (step S1412). As a result, the communication data is sent to another reconfigurable communication module 202.

As described, the transfer device 100, which transfers the communication data, has the search LSI 303, which is an example of a search unit, the search control FPGA 302, which is an example of a search control unit, the basic control mechanism 201, which is an example of a control unit, and the transfer LSI 301, which is an example of a transfer unit.

The search LSI 303 has the search resource pool 500, which is a collection of search resources constituted of tables (tables 1204, 1205, for example) that associate key items with other items, and search circuits that refer to the tables and search for values of the other items from values of the key items, which are fields in the header of the communication data.

The search LSI 303 has, in the search resource pool 500, at least a first search means (Ethernet search means 803, for example) that includes a first search resource (hash search resource 503, for example) that is constituted of a first table (hash table 523, for example) that associates first destination information (hash value of destination MAC address, for example) of communication data that is the value of the key item with first transfer destination information (transmission port number, for example) that is the value of the other item according to the first header format (Ethernet, for example) of the communication data, and a first search circuit (hash search circuit 513, for example) that searches the first transfer destination information from the first destination information with reference to the first table. When the first search means and the first destination information are designated, the search LSI 303 uses the first search circuit to refer to the first table and search for the first transfer destination information from the first destination information.

The search control FPGA 302 is a reconfigurable mechanism that creates search designation information that designates the position and size of the field in which the destination information is stored according to the header format, and a search means constituted of one or more search resources, and that outputs the search designation information to the search LSI 303.

The search control FPGA 302 executes a first search designation information creation process of creating first search designation information that designates first destination information (destination MAC address, for example) and the first search means (Ethernet search means 803, for example) identified according to a first header format and outputting the first search designation information to the search LSI 303, if the header format is the first header format (Ethernet, for example).

The basic control mechanism 201 controls the search LSI 303 and, in the remaining search resources of the search resource pool 500 excluding the first search resource, sets a second table that associates second destination information that is the value of the key item with the second transfer destination information that is the value of another item according to a second header format (new header format, for example) of the communication data, thereby creating in the search LSI 303 a second search means including at least a second search resource constituted of the second table and a second search circuit that refers to the second table to search for the second transfer destination information from the second destination information.

Also, the basic control mechanism 201 controls the search control FPGA 302 to add to the search control FPGA 302 a second search designation information creation process of creating second search designation information that designates the second search means and the second destination information if the header format is the second header format, and outputting the second search designation information to the search LSI 303.

The search LSI 301 receives the communication data and transmits the communication data to the transfer destination according to the transfer destination information searched according to the header format by the search LSI 303.

As a result, it is possible to flexibly handle cases in which a new header format emerges that needs to be added. Also, by executing a search by causing the search control FPGA 302 to designate the search means to a general use search LSI 303, it is possible to execute a high speed search process.

The search resource pool 500 includes a plurality of types of search resources in which the search method by the search circuits is the same but the key item sizes in the tables differ. Thus, it is possible to flexibly handle new versions of the header formats.

The search resource pool 500 includes a plurality of types of search resources with differing key item sizes in the tables. As a result, it is possible to flexibly handle new header formats and new search specifications required for searches under such header formats.

Additionally, the search circuit includes at least one of the TCAM search circuit, the table lookup search circuit, and the hash search circuit. Longest-match search can be executed by the TCAM search circuit, and thus, it is possible to reduce memory usage of the routing table. Also, the table-lookup circuit allows handling of table lookup of a label table such as in MPLS. Additionally, the hash search circuit can compress the search key to a hash value, and thus, it is possible to reduce memory usage of the table. A BCAM search circuit may be used instead of the hash search circuit.

Also, as a result of the search means being constituted of a plurality of search resources, it is possible to apply search results in previous search resources to latter stage search keys, and it is possible to flexibly handle search specifications of new formats.

Additionally, it is possible to issue sequence numbers in the transfer LSI 301 in the order of arrival, to circulate the search results from the transfer LSI 301 to the search control FPGA 302, the search LSI 303, the search control FPGA 302, and the transfer LSI 301, and to array the search results from the search LSI 303 in the order of the sequence numbers in the search control FPGA 302 and output the search results to the transfer LSI 301, and thus, it is possible for the search results to reflect the communication data received by the transfer LSI 301.

In particular, by comparing the issued sequence number with the sequence number that was circulated and returned, it is possible for the search results to accurately reflect the communication data received by the transfer LSI 301.

Embodiment 2

Next, Embodiment 2 will be described, primarily focusing on differences from Embodiment 1, and descriptions of portions in common with Embodiment 1 will be omitted. A reconfigurable communication module 202 according to Embodiment 2 can be flexibly scaled according to the transfer capabilities and search resource capacity by having a plurality of at least either of the transfer LSI 301 or the search LSI 303 connected to the search control FPGA 302.

Figure 15:
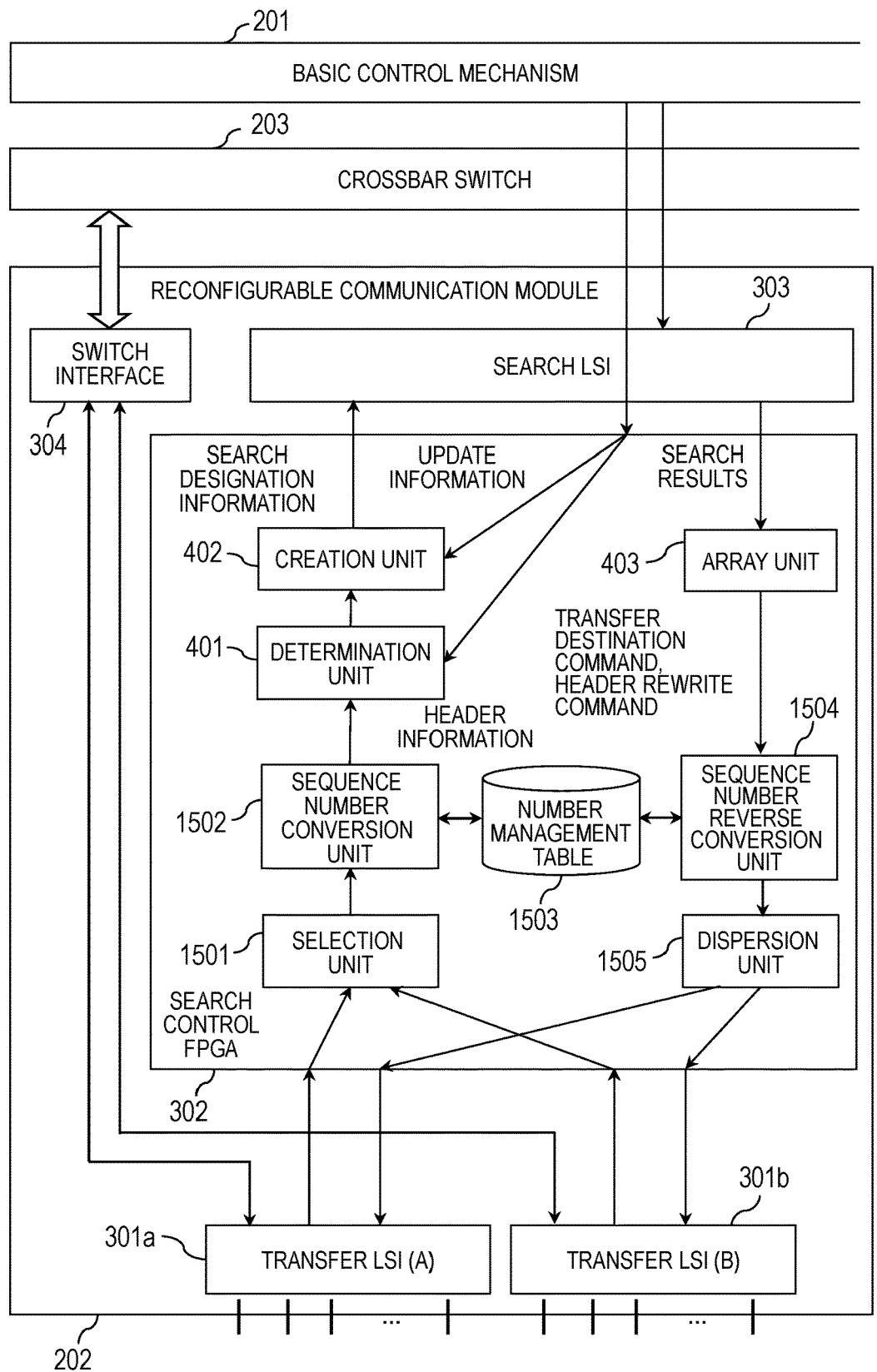
FIG. 15 is a block diagram showing a configuration example 1 of the reconfigurable communication module according to Embodiment 2.

FIG. 15 is a block diagram showing a configuration example 1 of the reconfigurable communication module 202 according to Embodiment 2. FIG. 15 shows an example in which two transfer LSIs 301 are connected. The number of transfer LSIs 301 connected is not necessarily limited to two, and three or more thereof may be connected. Also, it is possible to simultaneously connect a plurality of transfer LSIs 301 and a plurality of search LSIs 303 to one search control FPGA 302.

In FIG. 15, the reconfigurable communication module 202 has the plurality (two in the example of FIG. 15) of transfer LSIs 301a and 301b, the search control FPGA 302, a search LSI 303, and a switch interface 304. The identifying information of the transfer LSIs 301a and 301b is (A) and (B), respectively. The search control FPGA 302, in addition to the determination unit 401, the creation unit 402, and the array unit 403 shown in FIG. 4, has a selection unit 1501, a sequence number conversion unit 1502, a number management table 1503, a sequence number reverse conversion unit 1504, and a dispersion unit 1505.

The selection unit 1501 selects header information transmitted as a search designation from each of the transfer LSIs 301a and 301b according to a selection standard, adds the identifying information of the transmission destination transfer LSI to the header information, and outputs the header information to the sequence number conversion unit 1502. The header information, as described in Embodiment 1, is a combination of the sequence number of the communication data issued by the issuing unit 311 and the communication data extracted by the extraction unit 312, and also includes the identifying information of the transfer LSIs.

As the selection standard, the selection unit 1501 may select the header information in the order of arrival of the header information, may alternately select header information from the transfer LSI 301a and the header information from the transfer LSI 301b, or may select header information from the transfer LSI 301 with the smaller cumulative number of bytes handled.

The sequence number conversion unit 1502 converts the sequence number included in the header information selected by the selection unit 1501 to a common sequence number that is continuous or correlated for both of the transfer LSIs 301a and 301b.

The number management table 1503 is a table that associates and manages a sequence number that has been converted by the sequence number conversion unit 1502, a sequence number prior to conversion by the sequence number conversion unit 1502, and the identification information of the transfer LSI (transmission source transfer LSI) that is the transmission source for the sequence number prior to the conversion. The number management table 1503 can store as memory data the sequence number prior to conversion and the identifying information of the transmission source transfer LSI 301, with the converted sequence number as the memory address, by installing RAM (random access memory), for example.

The sequence number reverse conversion unit 1504 receives search results in the order of the converted sequence numbers as input from the array unit 403. The search results include the converted sequence numbers thereof. The sequence number reverse conversion unit 1504 refers to the number management table for each inputted search result, and identifies the sequence number prior to conversion and the identifying information of the transmission source transfer LSI. The sequence number reverse conversion unit 1504 outputs the search results, the sequence number prior to conversion, and the identifying information of the transmission source transfer LSI to the dispersion unit 1505.

The dispersion unit 1505 disperses the search results according to the identifying information of the transmission source transfer LSI. Specifically, for example, the dispersion unit 1505 outputs the search results to the transfer LSI identified by the identifying information of the transmission source LSI in the order of the sequence numbers prior to conversion.

Figure 16:
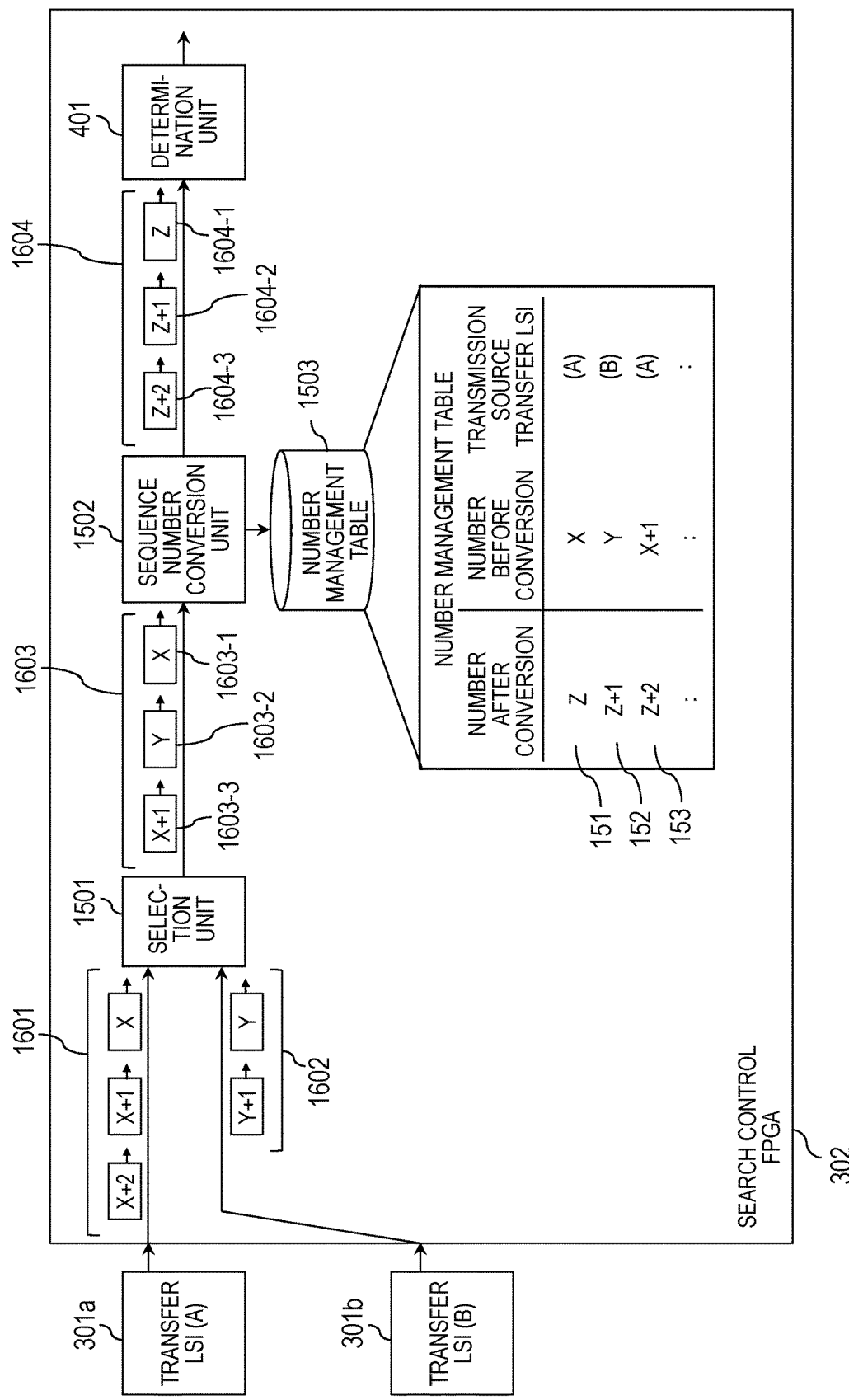
FIG. 16 is a descriptive drawing showing a data flow from the plurality of transfer LSIs to the determination unit according to Embodiment 2.

FIG. 16 is a descriptive drawing showing a data flow from the plurality of transfer LSIs 301 to the determination unit 401 according to Embodiment 2. Here, the sequence numbers included in the header information 1601 from the transfer LSI 301a are set to X, X+1, X+2, etc. and the sequence numbers included in the header information 1602 from the transfer LSI 301b are set to Y, Y+1, etc. The transfer LSI 301a and the transfer LSI 301b operate independently of each other, and there is no continuity or correlation between the sequence numbers X and Y issued by the issuing units 311 of the transfer LSIs 301a and 301b.

The selection unit 1501 selects either of the pieces of header information 1601 and 1602 from the transfer LSIs 301a and 301b according to the above-mentioned selection standard, adds the identifying information of the transmission source transfer LSIs 301a and 301b, and outputs the header information to the sequence number conversion unit 1502. Header information 1603 between the selection unit 1501 and the sequence number conversion unit 1502 is in a form that mixes the header information 1601 and 1602 from the transfer LSIs 301a and 301b (X, Y, X+1, etc.).

The sequence number conversion unit 1502 issues new and continuous sequence numbers Z, Z+1, Z+2, etc. every time the header information 1603 is inputted. Specifically, for example, the sequence number conversion unit 1502 issues the sequence number Z when header information 1603-1 including the sequence number X is inputted, issues the sequence number Z+1 when header information 1603-2 including the sequence number Y is inputted next, and then issues the sequence number Z+2 when header information 1603-3 including the sequence number X+1 is inputted.

Then, the sequence number conversion unit 1502 sequentially replaces the sequence numbers X, Y, X+1, etc., which have yet to be converted, with converted sequence numbers Z, Z+1, Z+2, etc., which were newly issued, and outputs header information 1604 including the converted sequence numbers to the determination unit 401. Also, the sequence number conversion unit 1502 associates the sequence number prior to conversion and the identifying information of the transmission source transfer LSI included in the header information 1603, with the newly issued sequence number after conversion, and records these as a new entry in the number management table 1503.

Specifically, for example, when the sequence number conversion unit 1502 acquires the header information 1603-1 including the sequence number X as the search designation, it issues the sequence number Z, and outputs the header information 1604-1 including the sequence number Z to the determination unit 401. Also, the sequence number conversion unit 1502 associates the sequence number X prior to conversion and the identifying information (A) of the transmission source transfer LSI included in the header information 1603-1, with the newly issued sequence number Z after conversion, and records these as a new entry 151 in the number management table 1503.

When the sequence number conversion unit 1502 acquires the header information 1603-2 including the sequence number Y as the search designation, it issues the sequence number Z+1, and outputs the header information 1604-2 including the sequence number Z+1 to the determination unit 401. The sequence number conversion unit 1502 associates the sequence number Y prior to conversion and the identifying information (B) of the transmission source transfer LSI included in the header information 1603-2, with the newly issued sequence number Z+1 after conversion, and records these as a new entry 152 in the number management table 1503.

When the sequence number conversion unit 1502 acquires the header information 1603-3 including the sequence number X+1 as the search designation, it issues the sequence number Z+2, and outputs the header information 1604-3 including the sequence number Z+2 to the determination unit 401. The sequence number conversion unit 1502 associates the sequence number X+1 prior to conversion and the identifying information (A) of the transmission source transfer LSI included in the header information 1603-3, with the newly issued sequence number Z+2 after conversion, and records these as a new entry 153 in the number management table 1503.

Figure 17:
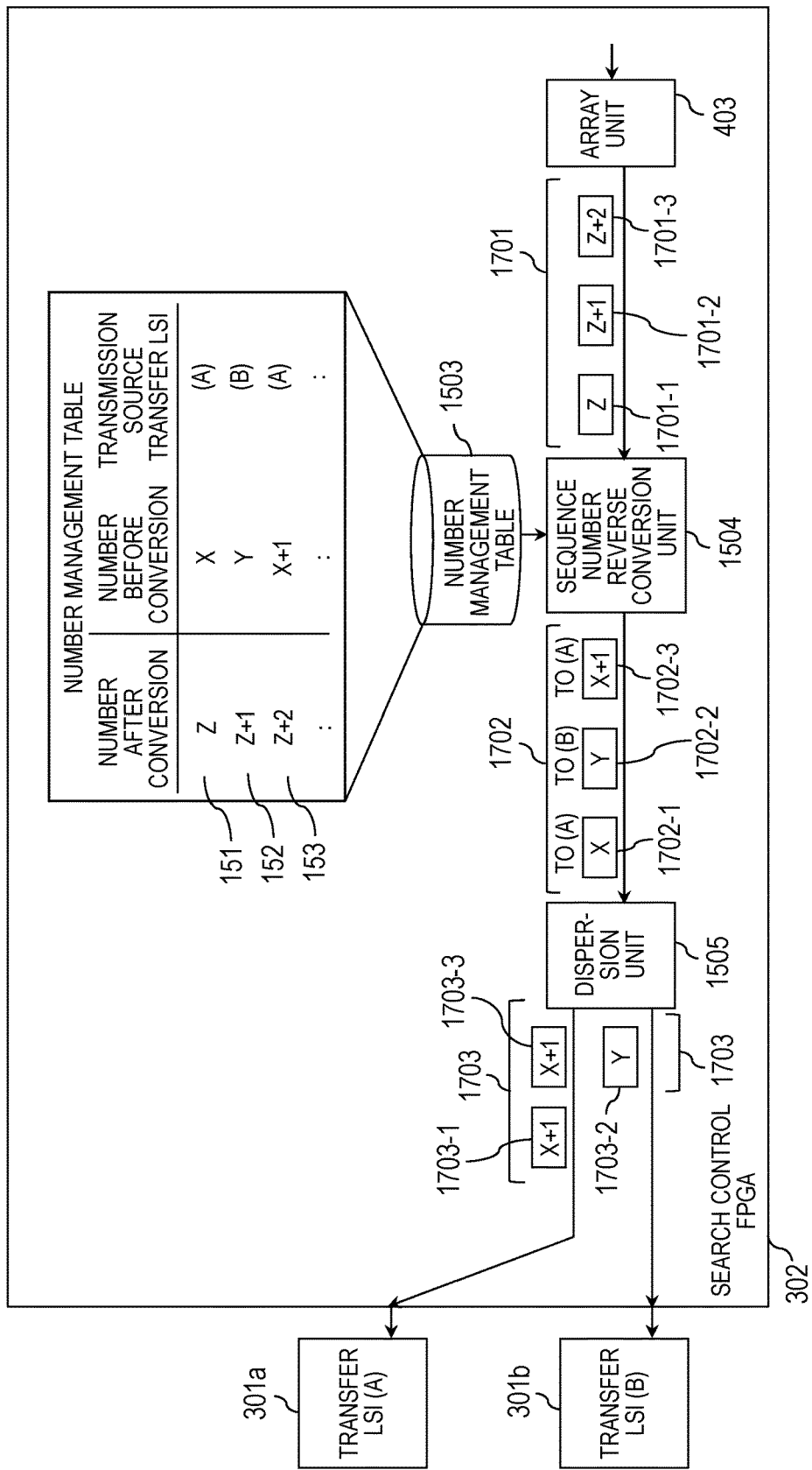
FIG. 17 is a descriptive drawing showing a data flow from the array unit to the plurality of transfer LSIs according to Embodiment 2.

FIG. 17 is a descriptive drawing showing a data flow from the array unit 403 to the plurality of transfer LSIs 301 according to Embodiment 2. Here, the search results from the array unit 403 include the converted sequence numbers that were added to the header information that is the search designation. If, for example, the header information 1604-1 including the sequence number Z is added to the search LSI 303, the search control FPGA 302 acquires from the search LSI 303 search results 1701-1 including the converted sequence number Z, search results 1701-2 including the converted sequence number Z+1, and search results 1701-3 including the converted sequence number Z+2, and adds the sequence numbers to the array unit 403. The array unit 403 outputs the search results 1701 to the sequence number reverse conversion unit 1504 in the order of the converted sequence numbers Z, Z+1, Z+2, etc.

When the sequence number reverse conversion unit 1504 receives the search results 1701-1 as input, it refers to the number management table 1503 to identify the entry 151 of the converted sequence number Z included in the search results 1701-1, and acquire the sequence number X prior to conversion and the identifying information (A) of the transmission source transfer LSI 301.

The sequence number reverse conversion unit 1504 assigns the converted sequence number Z included in the search results 1701-1 to replace the sequence number X prior to conversion that was acquired from the number management table 1503, adds the identifying information (A) of the transmission source transfer LSI acquired from the number management table 1503, and outputs these to the dispersion unit 1505 as the search results 1702-1.

When the sequence number reverse conversion unit 1504 receives the search results 1701-2 as input, it refers to the number management table 1503 to identify the entry 152 of the converted sequence number Z+1 included in the search results 1701-2, and acquire the sequence number Y prior to conversion and the identifying information (B) of the transmission source transfer LSI 301.

The sequence number reverse conversion unit 1504 assigns the converted sequence number Z+1 included in the search results 1701-2 to replace the sequence number Y prior to conversion that was acquired from the number management table 1503, adds the identifying information (B) of the transmission source transfer LSI acquired from the number management table 1503, and outputs these to the dispersion unit 1505 as the search results 1702-2.

When the sequence number reverse conversion unit 1504 receives the search results 1701-3 as input, it refers to the number management table 1503 to identify the entry 153 of the converted sequence number Z+2 included in the search results 1701-3, and acquire the sequence number X+1 prior to conversion and the identifying information (A) of the transmission source transfer LSI 301.

The sequence number reverse conversion unit 1504 assigns the converted sequence number Z+2 included in the search results 1701-3 to replace the sequence number X+1 prior to conversion that was acquired from the number management table 1503, adds the identifying information (A) of the transmission source transfer LSI acquired from the number management table 1503, and outputs these to the dispersion unit 1505 as the search results 1702-3.

When the search results 1702-1 are inputted, the dispersion unit 1505 identifies the transfer LSI 301*a* to be the transmission destination of the search results 1702-1 by the identifying information (A) of the transmission source transfer LSI included in the search results 1702-1. Then, the dispersion unit 1505 transmits the search results 1702-1 including the sequence number X prior to conversion to the transfer LSI 301*a* to be the transmission destination identified as the search results 1703-1.

When the search results 1702-2 are inputted, the dispersion unit 1505 identifies the transfer LSI 301*b* to be the transmission destination of the search results 1702-2 by the identifying information (B) of the transmission source transfer LSI included in the search results 1702-2. Then, the dispersion unit 1505 transmits the search results 1702-2 including the sequence number Y prior to conversion to the transfer LSI 301*b* to be the transmission destination identified as the search results 1703-2.

When the search results 1702-3 are inputted, the dispersion unit 1505 identifies the transfer LSI 301*a* to be the transmission destination of the search results 1702-3 by the identifying information (A) of the transmission source transfer LSI included in the search results 1702-3. Then, the dispersion unit 1505 transmits the search results 1702-3 including the sequence number X+1 prior to conversion to the transfer LSI 301*a* to be the transmission destination identified as the search results 1703-3.

In this manner, it is possible to connect the plurality of transfer LSIs 301 to one search control FPGA 302 and the search LSI 303, which enables flexible scaling of transfer capabilities. In other words, by installing a plurality of transfer LSIs, it is possible to execute transfer processes in parallel in the plurality of transfer LSIs, thereby improving the transfer bitrate.

Figure 18:
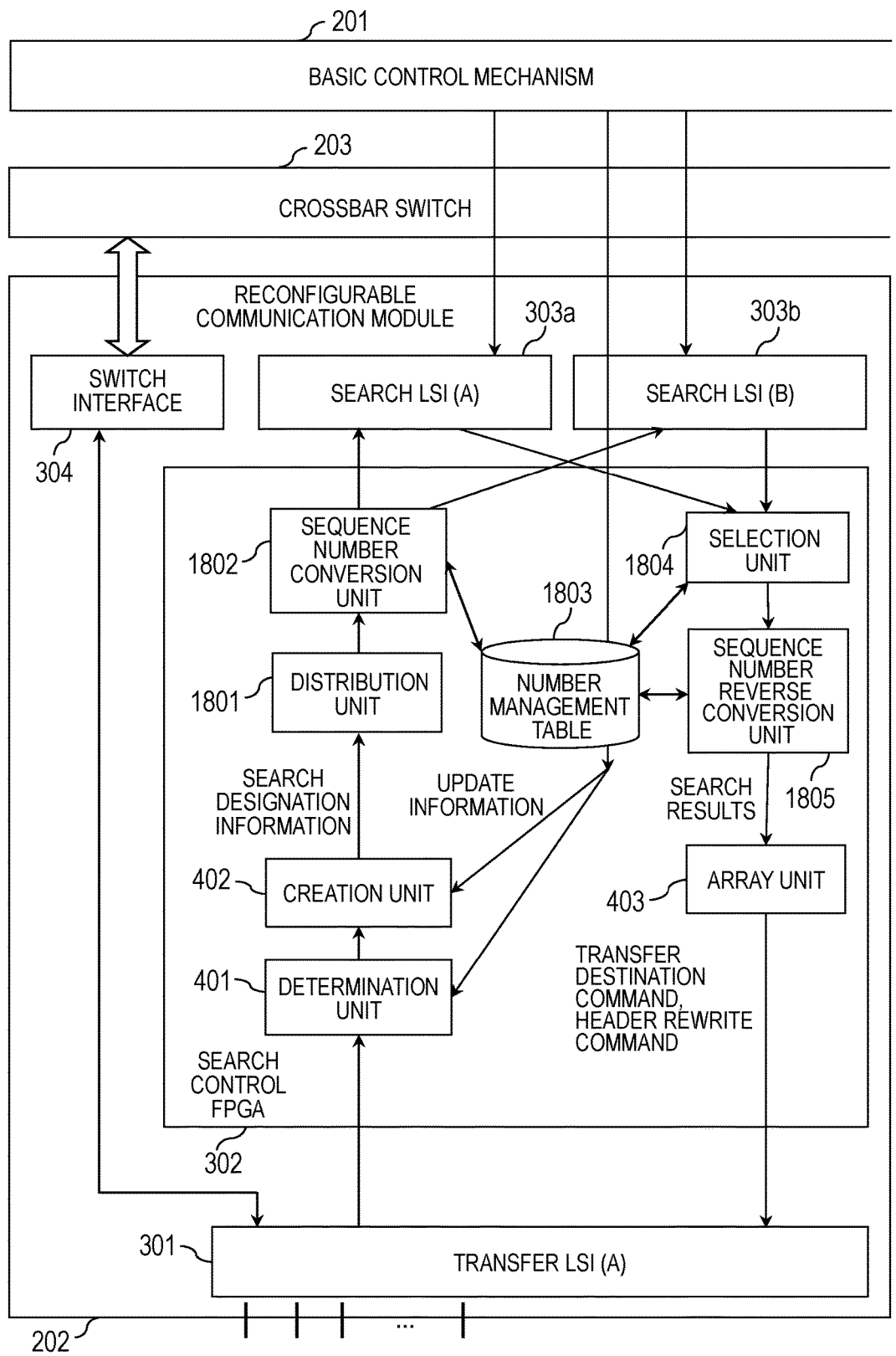
FIG. 18 is a block diagram showing a configuration example 2 of the reconfigurable communication module according to Embodiment 2.

FIG. 18 is a block diagram showing a configuration example 2 of the reconfigurable communication module 202 according to Embodiment 2. FIG. 18 shows an example in which two search LSIs 303 are connected. The number of search LSIs 303 connected is not necessarily limited to two, and three or more thereof may be connected. Also, it is possible to simultaneously connect a plurality of transfer LSIs 301 and a plurality of search LSIs 303 to one search control FPGA 302.

In FIG. 18, the reconfigurable communication module 202 has the transfer LSI 301, the search control FPGA 302, a plurality (two in the example of FIG. 18) of search LSIs 303a and 303b, and a switch interface 304. The identifying information of the search LSIs 303a and 303b is (A) and (B), respectively. The search control FPGA 302, in addition to the determination unit 401, the creation unit 402, and the array unit 403 shown in FIG. 4, has a distribution unit 1801, a sequence number conversion unit 1802, a number management table 1803, a sequence number reverse conversion unit 1805, and a selection unit 1804.

The search LSIs 303a and 303b may be differentiated by service (format). For example, a configuration may be adopted in which the search LSI 303a only has the IP search means 801 and the search LSI 303b has the MPLS search means 802 and the Ethernet search means 803. Alternatively, the search LSIs 303a and 303b may share the same service (format). For example, the search LSIs 303a and 303b may each have the IP search means 801.

The distribution unit 1801 receives the search designation information from the creation unit 402. The search designation information is, as described in Embodiment 1, information including the search key information and the search means designation information. The search key information includes the sequence number issued by the issuing unit 311.

The distribution unit 1801 can determine in advance which of the search LSIs 303 can be applied to which service. Specifically, if the search LSIs 303a and 303b have the IP search means 801 and the search LSI 303b has the MPLS search means 802 and the Ethernet search means 803, for example, the distribution unit 1801 refers to the search designation information and distributes the search designation information to either of the search LSIs 303a and 303b. Specifically, the distribution unit 1801 adds the identifying information of either of the search LSIs 303a and 303b to the search designation information and outputs the search designation information to the sequence number conversion unit 1802 in the order of the sequence numbers.

If the header format of the search designation information is IP, for example, then the distribution unit 1801 distributes the search designation information to either of the search LSIs 303a and 303b according to a distribution standard. As a distribution standard, the distribution unit 1801 may distribute the search designation information in the order of arrival of the search designation information where the header format is IP, may alternately distribute the search designation information, or may distribute the search designation information to the search LSI 303 with the smaller cumulative bytes handled. In the above example, if the header format of the search designation information is MPLS or Ethernet, then the distribution unit 1801 distributes the search designation information to the search LSI 303b according to the distribution standard.

The sequence number conversion unit 1802 converts the sequence number included in the search designation information distributed by the distribution unit 1801. Specifically, for example, the sequence number conversion unit 1802 converts the sequence number included in the search designation information to a continuous or correlating sequence number for each piece of identifying information of the destination search LSI 303. The sequence number conversion unit 1802 outputs the search designation information including the converted sequence number to the destination search LSI 303.

The number management table 1803 is a table that associates and manages a sequence number that has been converted by the sequence number conversion unit 1802, a sequence number prior to conversion included in the search designation information, and the identification information of the destination search LSI 303. The number management table 1803 can store as memory data the sequence number prior to conversion and the destination search LSI 303, with the converted sequence number as the memory address, by installing RAM (random access memory), for example.

The selection unit 1804 selects search results from each of the search LSIs 303a and 303b according to a selection standard, and outputs the search results to the sequence number conversion unit 1502. Specifically, for example, the selection unit 1804 reads the identifying information of the destination search LSI 303 from the top entry of the number management table 1803 prior to the input of search results. For example, the selection unit 1804 reads the identifying information (A) of the search LSI 303 that is the destination of the unselected entries of the number management table 1803, starting at the top entry. If there are search results retained in FIFO memory, the selection unit 1804 determines whether the added information (converted sequence number and identifying information of the search LSI 303 from which the search results were transmitted) of the search results matches the entry read in advance.

Specifically, for example, the selection unit 1804 determines whether the converted sequence number of the entry read in advance is included in the search results, and whether the search LSI 303 identified by the identifying information of the entry destination search LSI is the transmission source for the search results. If the search results match, the selection unit 1804 selects the matching search results (deletes the read entry from the FIFO memory) and outputs the search results to the sequence number reverse conversion unit 1805. If the search results do not match, the selection unit 1804 stands by for the next search results.

If search results from any of the search LSIs 303 are inputted when there are no search results retained in the FIFO memory or the search results do not match, the selection unit 1804 determines whether the entry read in advance matches the added information of the inputted search results. If the search results match, the selection unit 1804 selects the matching search results and outputs the search results to the sequence number reverse conversion unit 1805. If the search results do not match, the selection unit 1804 retains the search results in the FIFO memory and stands by for the next search results.

If the number management table 1803 is implemented with RAM, then it is possible to acquire the identifying information of the destination search LSI 303 by setting the sequence numbers X, X+1, etc. as the memory read addresses.

The sequence number reverse conversion unit 1805 receives search results in the order of selection by the selection unit 1804 as input from the selection unit 1804. The sequence number reverse conversion unit 1805 refers to the number management table for each inputted search result, and identifies the sequence number prior to conversion and the identifying information of the destination search LSI 303. The sequence number reverse conversion unit 1805 adds the converted sequence number corresponding to the sequence number prior to conversion to the search results and outputs this to the creation unit 402.

Figure 19:
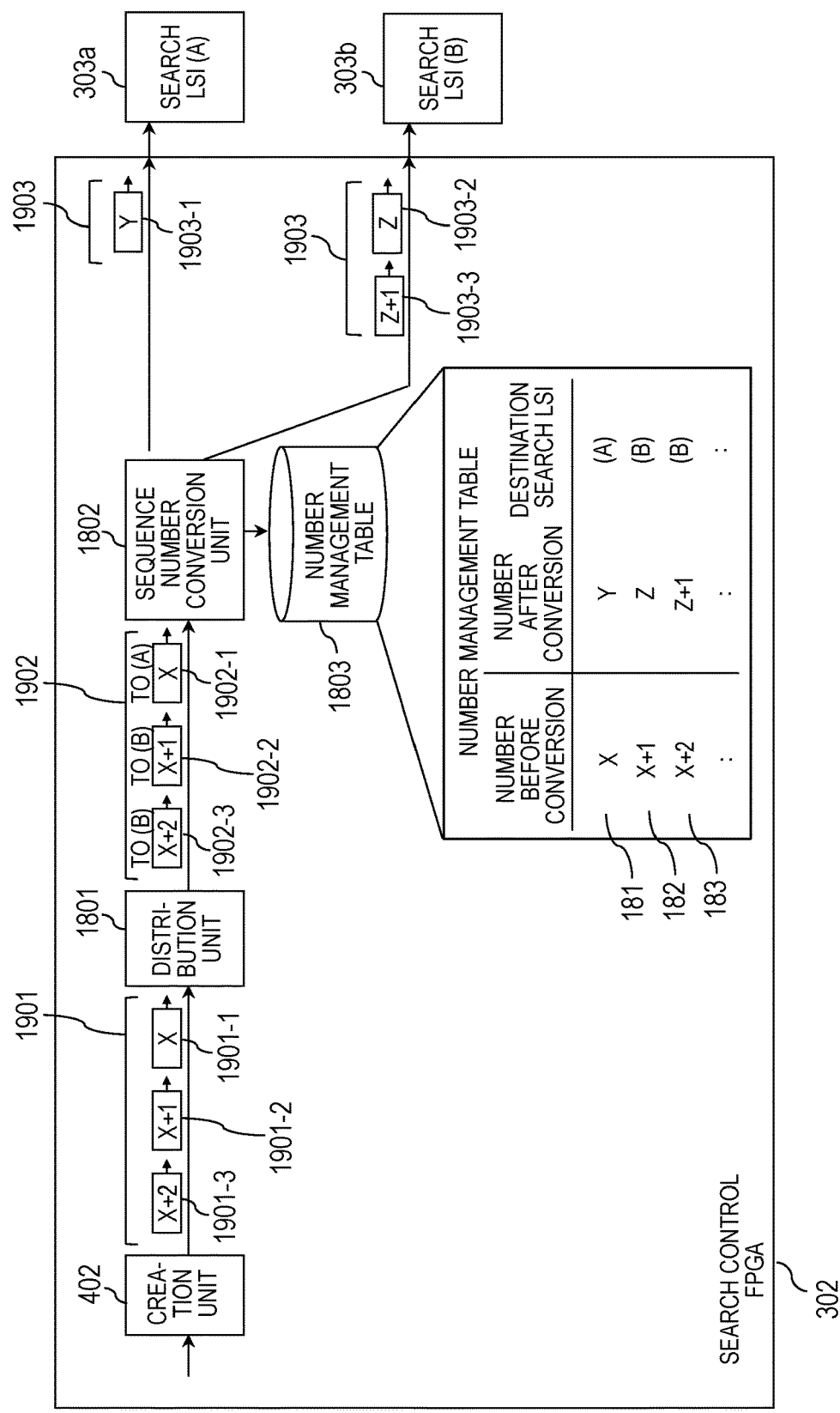
FIG. 19 is a descriptive drawing showing a data flow from the creation unit to the plurality of search LSIs according to Embodiment 2.

FIG. 19 is a descriptive drawing showing a data flow from the creation unit 402 to the plurality of search LSIs 303 according to Embodiment 2. Here, the sequence numbers included in the search designation information 1901 from the creation unit 402 are X, X+1, X+2, etc., the sequence numbers included in the search designation information 1903 from the sequence number conversion unit 1802 to the search LSI 303*a* are Y, Y+1, etc., and the sequence numbers included in the search designation information 1903 from the sequence number conversion unit 1802 to the search LSI 303*b* are Z, Z+1, etc. The search LSIs 303*a* and 303*b* operate independently of each other, and there is no continuity or correlation between the sequence numbers X, Y, and Z.

Also, the search LSI 303*a* has the IP search means 801 and the search LSI 303*b* has the IP search means 801, the MPLS search means 802, and the Ethernet search means 803.

The distribution unit 1801 sequentially receives the search designation information 1901 from the creation unit 402, and for each piece of search designation information 1901, the distribution unit 1801 determines to which of the search LSIs 303 the header format (service) of the received search designation information 1901 can be applied. If, for example, the header format of the search designation information 1901-1 including the topmost sequence number X is IP, then first, in order to distribute the search designation information 1901-1 to the search LSI 303*a*, the identifying information (A) of the destination search LSI 303 is added to the search designation information 1901-1, and outputted to the sequence number conversion unit 1802 as the search designation information 1902-1 including the sequence number X and the identifying information (A) of the destination search LSI 303.

If the header format of the search designation information 1901-2 including the next sequence number X+1 is MPLS, then first, in order to distribute the search designation information 1901-2 to the search LSI 303*b*, the identifying information (B) of the destination search LSI 303 is added to the search designation information 1901-2, and outputted to the sequence number conversion unit 1802 as the search designation information 1902-2 including the sequence number X+1 and the identifying information (B) of the destination search LSI 303.

If the header format of the search designation information 1901-3 including the next sequence number X+2 is IP, then in order to distribute the search designation information 1901-3 to the search LSI 303*b* (since the search designation information 1901-1 was distributed to the search LSI 303*a*), the identifying information (B) of the destination search LSI 303 is added to the search designation information 1901-3, and outputted to the sequence number conversion unit 1802 as the search designation information 1902-3 including the sequence number X+2 and the identifying information (B) of the destination search LSI 303.

The sequence number conversion unit 1802 converts the sequence number included in the search designation information 1902 from the distribution unit 1801. Specifically, for example, when the sequence number conversion unit 1802 receives the search designation information 1902-1, it identifies the identifying information (A) of the destination search LSI 303 included in the search designation information 1902-1. A converted sequence number has not yet been issued for the search LSI 303*a* identified by the identifying information (A) of the destination search LSI 303, and thus, the sequence number conversion unit 1802 issues the converted sequence number Y that is not continuous or correlated with the sequence number X prior to conversion, and then replaces the sequence number X, which has not yet been converted. The sequence number conversion unit 1802 outputs the search designation information 1903-1 including the converted sequence number Y to the search LSI 303*a* identified by the identifying information (A) of the destination search LSI 303. Also, the sequence number conversion unit 1802 records in the number management table 1803 the entry 181 that associates the sequence number X prior to conversion, the converted sequence number Y, and the identifying information (A) of the destination search LSI 303.

Figure 20:
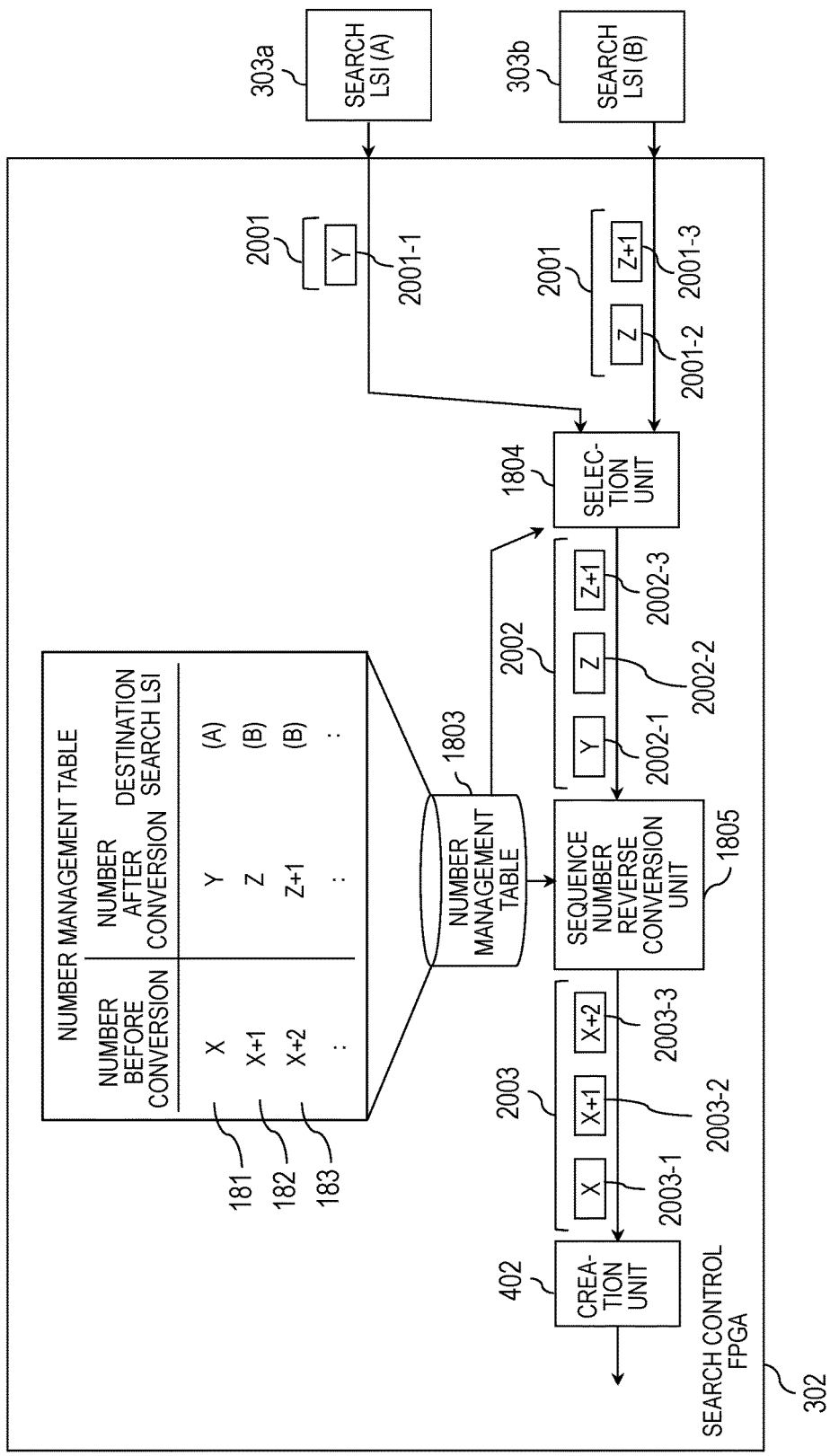
FIG. 20 is a descriptive drawing showing a data flow from the plurality of search LSIs to the creation unit according to Embodiment 2.

Thus, as shown in FIG. 20, the search LSI 303*a* receives the search designation information 1903-1, and using the IP search means 801 returns the search results 2001-1 (transmission port number and destination MAC address) to the search control FPGA 302.

When the sequence number conversion unit 1802 receives the search designation information 1902-2, it identifies the identifying information (B) of the destination search LSI 303 included in the search designation information 1902-2. A converted sequence number has not yet been issued for the search LSI 303*b* identified by the identifying information (B) of the destination search LSI 303, and thus, the sequence number conversion unit 1802 issues the converted sequence number Z that is not continuous or correlated with the sequence number X prior to conversion or the converted sequence number Y, and then replaces the sequence number X+1, which has not yet been converted. The sequence number conversion unit 1802 outputs the search designation information 1903-2 including the converted sequence number Z to the search LSI 303*b* identified by the identifying information (B) of the destination search LSI 303. Also, the sequence number conversion unit 1802 records in the number management table 1803 the entry 182 that associates the sequence number X+1 prior to conversion, the converted sequence number Z, and the identifying information (B) of the destination search LSI 303.

Thus, as shown in FIG. 20, the search LSI 303*b* receives the search designation information 1903-2, and using the MPLS search means 802 returns the search results 2001-2 (out shim label, transmission port number, and destination MAC address) to the search control FPGA 302.

When the sequence number conversion unit 1802 receives the search designation information 1902-3, it identifies the identifying information (B) of the destination search LSI 303 included in the search designation information 1902-3. The converted sequence number Z has already been issued for the search LSI 303*b* identified by the identifying information (B) of the destination search LSI 303, and thus, the sequence number conversion unit 1802 issues the converted sequence number Z+1 that is not continuous or correlated with the sequence number X+1 prior to conversion or the converted sequence number Y but is continuous or correlated with the converted sequence number Z, and then replaces the sequence number X+2, which has not yet been converted. The sequence number conversion unit 1802 outputs the search designation information 1903-3 including the converted sequence number Z+1 to the search LSI 303*b* identified by the identifying information (B) of the destination search LSI 303. Also, the sequence number conversion unit 1802 records in the number management table 1803 the entry 183 that associates the sequence number X+2 prior to conversion, the converted sequence number Z+1, and the identifying information (B) of the destination search LSI 303.

Thus, as shown in FIG. 20, the search LSI 303*b* receives the search designation information 1903-3, and using the IP search means 801 returns the search results 2001-3 (transmission port number and destination MAC address) to the search control FPGA 302.

FIG. 20 is a descriptive drawing showing a data flow from the plurality of search LSIs 303 to the creation unit 402 according to Embodiment 2. The selection unit 1804 receives the search results 2001-1, 2001-2, and 2001-3 in the stated order. The search results 2001-1, 2001-2, and 2001-3 respectively include the converted sequence numbers Y, Z, and Z+1.

The selection unit 1804 reads entries of the number management table 1803 started at the top prior to receiving as input the search results 2001-1, 2001-2, and 2001-3. In this case, the selection unit 1804 reads the entry 181, which is the top entry of the number management table 1803. When the selection unit 1804 receives the search result 2001-1, it determines whether the converted sequence number Y and the identifying information (A) of the destination search LSI of the read entry 181 match the information added to the search result 2001-1 (converted sequence number Y and identifying information (A) of the transmission source search LSI of the search result 2001-1). In this case, the information matches, and thus, the selection unit 1804 outputs the search result 2002-1 to the sequence number reverse conversion unit 1805.

If a search delay in the search LSI 303*a* results in the selection unit 1804 receiving the search result 2001-2 from the search LSI 303*b* before the search result 2001-1, then the converted sequence number Y and the identifying information (A) of the destination search LSI of the entry 181 do not match the information added to the search result 2001-2 (converted sequence number Z and identifying information (B) of the transmission source search LSI of the search result 2001-1). Thus, the selection unit 1804 retains the search result 2001-2 in the FIFO memory and awaits the search result 2001-1.

The selection unit 1804 outputs the search result 2001-1 to the sequence number reverse conversion unit 1805 and then reads the next entry of the number management table 1803. In this case, the selection unit 1804 reads the entry 182 following the entry 21 of the number management table 1803. When the selection unit 1804 receives the search result 2001-2, it determines whether the converted sequence number Z and the identifying information (B) of the destination search LSI of the read entry 182 match the information added to the search result 2001-2 (converted sequence number Z and identifying information (B) of the transmission source search LSI of the search result 2001-2). In this case, the information matches, and thus, the selection unit 1804 outputs the search result 2002-2 to the sequence number reverse conversion unit 1805.

The selection unit 1804 outputs the search result 2001-2 to the sequence number reverse conversion unit 1805 and then reads the next entry of the number management table 1803. In this case, the selection unit 1804 reads the entry 183 following the entry 22 of the number management table 1803. When the selection unit 1804 receives the search result 2001-3, it determines whether the converted sequence number Z+1 and the identifying information (B) of the destination search LSI of the read entry 183 match the information added to the search result 2001-3 (converted sequence number Z+1 and identifying information (B) of the transmission source search LSI of the search result 2001-3). In this case, the information matches, and thus, the selection unit 1804 outputs the search result 2002-3 to the sequence number reverse conversion unit 1805.

In this manner, the selection unit 1804 outputs the search results 2001-1 to 2001-3 to the sequence number reverse conversion unit 1805 as the search results 2002-1 to 2002-3.

When the sequence number reverse conversion unit 1805 receives the search results 2001-1, it identifies from the number management table 1803 the entry 181 corresponding to the added information (converted sequence number Y and identifying information (A) of the transmission source search LSI of the search result 2001-1), and acquires the not yet converted sequence number X of the entry 181. Then, the sequence number reverse conversion unit 1805 replaces the acquired sequence number X, which has yet to be converted, with the converted sequence number Y in the added information, and outputs this as the search result 2003-1 to the creation unit 402. Also, the sequence number reverse conversion unit 1805 deletes the entry 21 from the number management table 1803.

When the sequence number reverse conversion unit 1805 receives the search results 2001-2, it identifies from the number management table 1803 the entry 182 corresponding to the added information (converted sequence number Z and identifying information (B) of the transmission source search LSI of the search result 2001-2), and acquires the not yet converted sequence number X+1 of the entry 182. Then, the sequence number reverse conversion unit 1805 replaces the acquired sequence number X+1, which has yet to be converted, with the converted sequence number Z in the added information, and outputs this as the search result 2003-2 to the creation unit 402. Also, the sequence number reverse conversion unit 1805 deletes the entry 22 from the number management table 1803.

When the sequence number reverse conversion unit 1805 receives the search results 2001-3, it identifies from the number management table 1803 the entry 183 corresponding to the added information (converted sequence number Z+1 and identifying information (B) of the transmission source search LSI of the search result 2001-3), and acquires the not yet converted sequence number X+2 of the entry 183. Then, the sequence number reverse conversion unit 1805 replaces the acquired sequence number X+2, which has yet to be converted, with the converted sequence number Z+1 in the added information, and outputs this as the search result 2003-3 to the creation unit 402. Also, the sequence number reverse conversion unit 1805 deletes the entry 23 from the number management table 1803.

In this manner, it is possible to connect the plurality of search LSIs 303 to one search control FPGA 302 and the transfer LSI 301, which enables flexible scaling of search capabilities and the search resource pool.

Also, by simultaneously using the configuration example shown in FIG. 15 and the configuration example shown in FIG. 18, it is possible to connect M (M being an integer of two or greater) transfer LSIs 301 and N (N being an integer of two or greater) search LSIs 303 to one search control FPGA 302, which enables flexible scaling of transfer capabilities, search capabilities, and the search resource pool.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A transfer device that transfers communication data, comprising:
    a search unit having a search resource group that is a collection of search resources constituted of tables that associate key items with other items, and search circuits that refer to the tables and search for values of the other items from values of the key items that are fields in the header of the communication data, the search resource group having at least a first search means that includes a first search resource that is constituted of a first table that associates first destination information of the communication data that is the value of the key item with first transfer destination information that is the value of the other item according to a first header format of the communication data, and a first search circuit that searches the first transfer destination information from the first destination information with reference to the first table, the search unit referring to the first table using the first search circuit to search for the first transfer destination information from the first destination information when the first search means and the first destination information are designated;
    a search control unit that is a reconfigurable mechanism that creates search designation information that designates a position and size of the field in which the destination information is stored according to a format of the header, and a search means constituted of one or more search resources, and that outputs the search designation information to the search unit, the search control unit executing a first search designation information creation process of creating first search designation information that designates the first destination information and the first search means identified according to the first header format and outputting the first search designation information to the search unit, if the format of the header is the first header format;
    a control unit that controls the search unit and, in remaining search resources of the search resource group excluding the first search resource, sets a second table that associates second destination information that is the value of the key item with the second transfer destination information that is the value of the other item according to a second header format of the communication data, thereby creating in the search unit at least a second search means including a second search resource constituted of the second table and a second search circuit that refers to the second table to search for the second transfer destination information from the second destination information, the control unit controlling the search control unit to add to the search control unit a second search designation information creation process of creating second search designation information that designates the second search means and the second destination information if the format of the header is the second header format, and outputting the second search designation information to the search unit; and
    a transfer unit that receives the communication data and transmits the communication data to a transfer destination on the basis of the transfer destination information searched according to the format of the header by the search unit.

2. The transfer device according to claim 1,
    wherein the search resource group includes a plurality of types of search resources in which a search method by the search circuits is the same but sizes of the key items in the tables differ.

3. The transfer device according to claim 1,
    wherein the search resource group includes a plurality of types of search resources in which search methods by the search circuits differ.

4. The transfer device according to claim 1,
    wherein the search circuits perform a longest-match search of the values of the key items of the table in a field being searched in the communication data, and extract the values of the other items associated with the values of the key items for which there is a longest match.

5. The transfer device according to claim 1,
    wherein the search circuits perform a search of the values of the key items of the table in a field being searched in the communication data, and extract the values of the other items associated with the values of the searched key items.

6. The transfer device according to claim 1,
    wherein the search circuits convert a field being searched in the communication data to a hash value and perform a search of the values of the key items of the table using the hash value, and extract the values of the other items associated with the values of the searched key items.

7. The transfer device according to claim 1,
    wherein the control unit
    controls the search unit and, in the remaining search resources, sets a second table that associates the second destination information that is the value of the key item with the second transfer destination information that is the value of the other item, and a third table that associates the second transfer destination information that is the value of the key item with third transfer destination information that is the value of the other item, according to the second header format of the communication data, thereby creating in the search unit a third search means including a second search resource constituted of the second table and a second search circuit that refers to the second table to search for the second transfer destination information from the second destination information, and a third search resource constituted of the third table and a third search circuit that refers to the third table to search for the third transfer destination information from the second transfer destination information, and controls the search control unit to add to the search control unit a third search designation information creation process of creating third search designation information that designates the third search means and the second destination information if the header of the communication data is in the second header format, and outputting the third search designation information to the search unit.

8. The transfer device according to claim 1, wherein the transfer unit has:

an issuing unit that issues a sequence number indicating an order at which the communication data arrives; and an output unit that outputs the header and the sequence number issued by the issuing unit to the search control unit, wherein the search control unit outputs the search designation information including the sequence number to the search unit, wherein the search unit associates the transfer destination information with the sequence number and outputs the transfer destination information and the sequence number to the search control unit, and wherein the search control unit outputs the transfer destination information to the transfer unit in order of the sequence number from the search unit.

9. The transfer device according to claim 8, wherein the transfer unit has:

a retention unit that retains the communication data and the sequence number; and an updating unit that, if the sequence number retained in the retention unit matches the sequence number inputted together with the transfer destination information from the search control unit, updates the header of the communication data retained in the retention unit with the transfer destination information, wherein the communication data that has been updated by the updating unit is transmitted to a transfer destination identified by the transfer destination information.

10. The transfer device according to claim 8, further comprising:

a plurality of said transfer units, wherein if the search control unit receives input of the headers and the sequence numbers from the plurality of transfer units, then the search control unit converts the sequence numbers from the plurality of transfer units to sequence numbers that are continuous or correlated, and outputs the search designation information including the converted sequence numbers to the search unit, wherein the search unit associates the transfer destination information with the converted sequence number and outputs the transfer destination information and the sequence number to the search control unit, and wherein the search control unit converts the sequence numbers to sequence numbers prior to conversion in order of the converted sequence numbers from the search unit, and outputs the transfer destination information to the transfer unit that is the source of the sequence numbers prior to conversion.

11. The transfer device according to claim 8, further comprising:

a plurality of said search units, wherein the search control unit can identify whether the plurality of search units can handle a format of any of the headers, identifies a search unit to be a destination of the search designation information on the basis of the format of the header that is the source for creating the search designation information, converts the sequence numbers included in the search designation information to sequence numbers that are continuous or correlated for each of the search units, and outputs the search designation information including the converted sequence numbers to the search unit to be the destination of the search designation information, and performs a reverse conversion of the converted sequence numbers included in the transfer destination information from the plurality of search units to the sequence numbers prior to conversion, and outputs the transfer destination information to the transfer unit in order of the sequence numbers prior to conversion.

* * * * *